(12) United States Patent
Pham et al.

(10) Patent No.: US 11,985,494 B2
(45) Date of Patent: May 14, 2024

(54) APPARATUS FOR PROVIDING AUDIO DATA TO MULTIPLE AUDIO LOGICAL DEVICES

(71) Applicant: STEELSERIES ApS, Frederiksberg (DK)

(72) Inventors: Hong Cong Tuyen Pham, Croix (FR); Raphaël Greff, Lille (FR); Vincenzo Giamundo, Lille (FR); Matthieu Campion, Wasquehal (FR); Paul Allais, Saint-Andre (FR); Nathan Souviraa-Labastie, Mons-en-Baroeul (FR)

(73) Assignee: STEELSERIES ApS, Copenhagen (DK)

( * ) Notice: Subject to any disclaimer, the term of this patent is extended or adjusted under 35 U.S.C. 154(b) by 0 days.

(21) Appl. No.: 17/326,585

(22) Filed: May 21, 2021

(65) Prior Publication Data

US 2022/0329959 A1 Oct. 13, 2022

Related U.S. Application Data

(60) Provisional application No. 63/171,655, filed on Apr. 7, 2021.

(51) Int. Cl.
*H04S 7/00* (2006.01)
*H04S 5/00* (2006.01)

(52) U.S. Cl.
CPC ............... *H04S 7/30* (2013.01); *H04S 5/005* (2013.01)

(58) Field of Classification Search
CPC combination set(s) only.
See application file for complete search history.

(56) References Cited

U.S. PATENT DOCUMENTS

2006/0233378 A1* 10/2006 Kim .................... H04S 3/02
381/1
2008/0063211 A1* 3/2008 Kusunoki ............ H04R 5/04
381/18

(Continued)

FOREIGN PATENT DOCUMENTS

WO WO2014040667 3/2014
WO WO2020149708 7/2020

OTHER PUBLICATIONS

"How to Fix Sound Delay in Bluetooth Headphones", Feb. 16, 2021, 19 pages.

(Continued)

*Primary Examiner* — Duc Nguyen
*Assistant Examiner* — Assad Mohammed
(74) *Attorney, Agent, or Firm* — Guntin & Gust, PLC; Miyoung Shin

(57) ABSTRACT

A system and method that incorporates the subject disclosure may include, for example, receiving a multichannel audio stream; forming a front channel audio stream of the multichannel audio stream, including combining a first subset of audio channels of the multichannel audio stream to form the front channel audio stream; forming a surround channel audio stream of the multichannel audio stream including combining a second subset of audio channels of the multichannel audio stream to form the surround channel audio stream; providing the front channel audio stream to a primary set of speakers positioned in front of a listener and providing the surround channel audio stream to a supplemental speaker positioned behind the listener; and synchronizing the front channel audio stream and the surround channel audio stream. Additional embodiments are disclosed.

20 Claims, 15 Drawing Sheets

(56) References Cited

U.S. PATENT DOCUMENTS

| | | | |
|---|---|---|---|
| 2008/0075302 A1* | 3/2008 | Wei | H04S 7/307 |
| | | | 381/98 |
| 2012/0121092 A1* | 5/2012 | Starobin | H04R 5/02 |
| | | | 381/300 |
| 2012/0243713 A1* | 9/2012 | Hess | H04S 7/302 |
| | | | 381/307 |
| 2014/0254801 A1* | 9/2014 | Srinivasan | G10L 19/018 |
| | | | 381/17 |
| 2016/0150346 A1* | 5/2016 | Reuss | H04S 7/303 |
| | | | 381/303 |
| 2017/0078824 A1* | 3/2017 | Heo | H04S 7/308 |
| 2017/0099558 A1 | 4/2017 | Spitznagle et al. | |
| 2018/0027368 A1* | 1/2018 | Girardier | H04S 7/308 |
| | | | 455/41.2 |
| 2018/0098151 A1* | 4/2018 | Penke | H04R 3/12 |
| 2018/0136898 A1* | 5/2018 | Shi | H04S 7/308 |
| 2018/0220249 A1 | 8/2018 | Aoki et al. | |
| 2020/0367009 A1* | 11/2020 | Family | H04S 7/30 |
| 2021/0195364 A1* | 6/2021 | Bouvigne | G06F 3/165 |
| 2022/0030505 A1 | 1/2022 | Lee et al. | |

OTHER PUBLICATIONS

"VB-AUDIO Software", Audio Apps, 1998-2019, 10 pages.
"VB-AUDIO Software", Voicemeeter, 1998-2020, 11 pages.
"International Search Report and the Written Opinion", PCT/IB2022/053261, 22 pages.

* cited by examiner

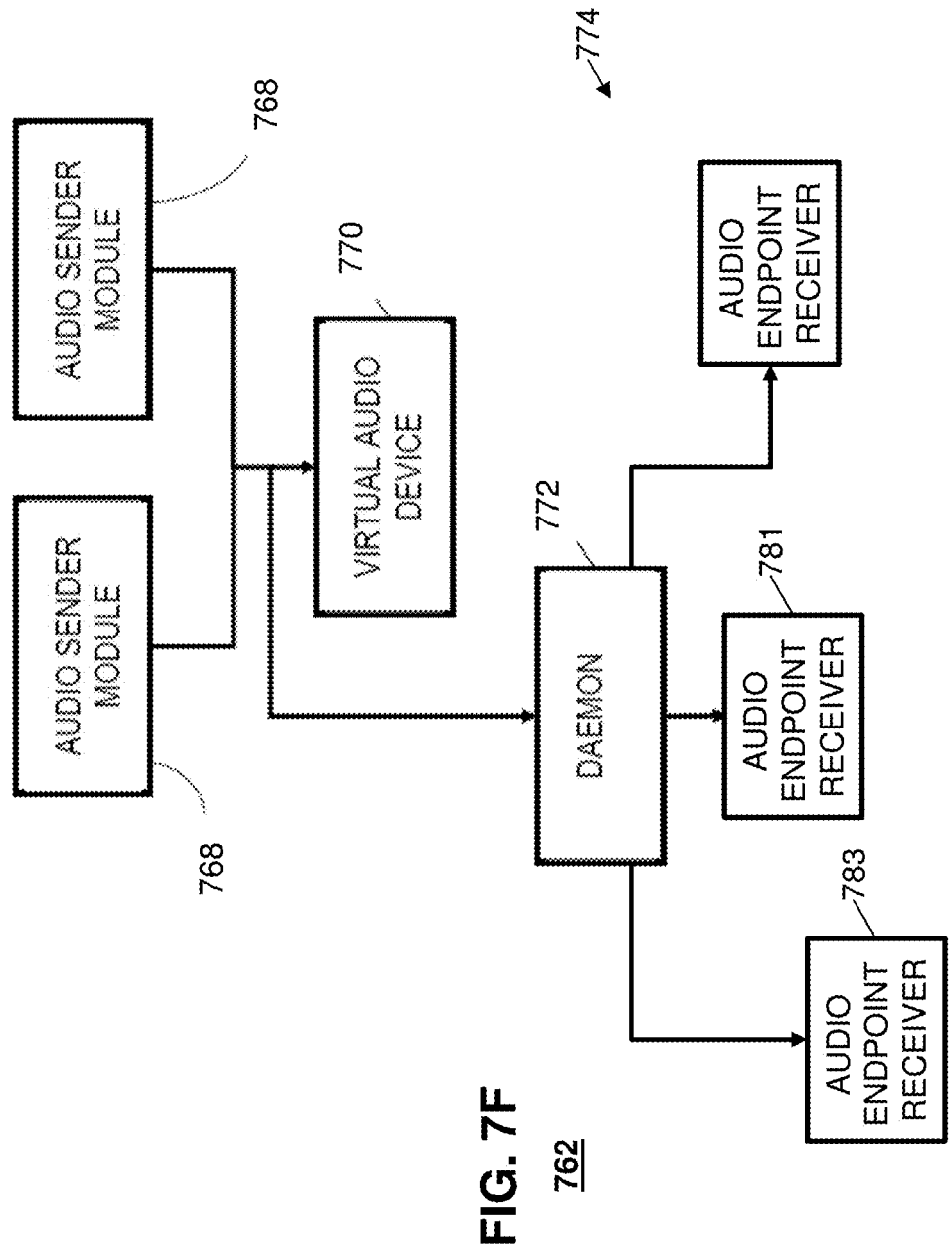

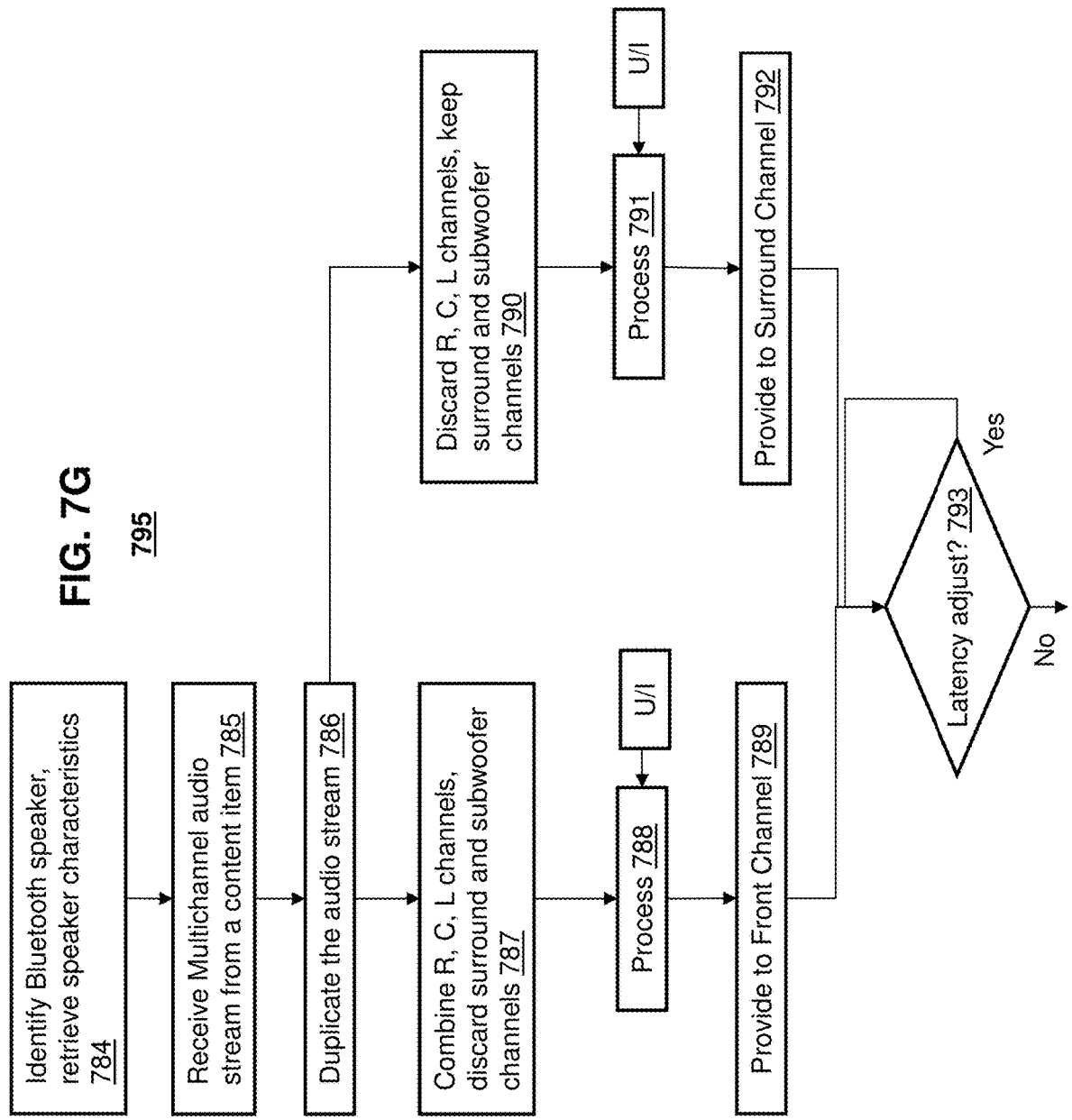

900

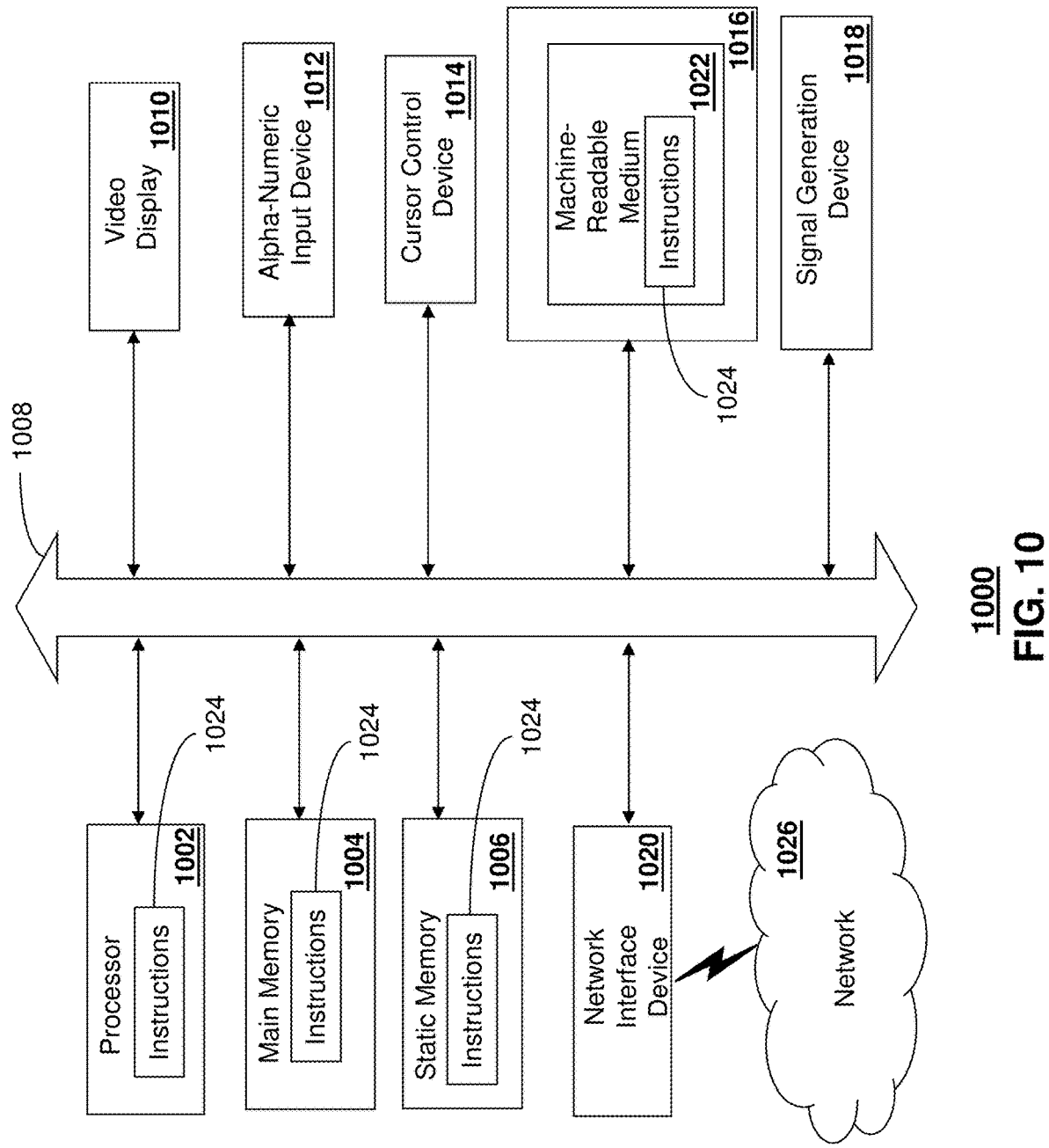

APPARATUS FOR PROVIDING AUDIO DATA TO MULTIPLE AUDIO LOGICAL DEVICES

CROSS-REFERENCE TO RELATED APPLICATION(S)

The present application claims the benefit of priority to U.S. Provisional Application No. 63/171,655 filed Apr. 7, 2021, all sections of which are hereby incorporated herein by reference in their entirety.

FIELD OF THE DISCLOSURE

The present disclosure relates generally to method and apparatus for providing audio data to multiple audio logical devices.

BACKGROUND

It is common today for gamers to utilize more than one gaming accessory. This is especially true of gamers who play on-line games or competitive games in a team or individual configuration. Gamers can have at their disposal accessories such as a keyboard, a general-purpose gaming pad, a mouse, a gaming console controller, a headset to communicate with other players, a joystick, a computer console, or other common gaming accessories.

A gamer can frequently use a combination of these accessories in a single game (e.g., headset, a keyboard, and mouse). Efficient management and utilization of these accessories can frequently impact a gamer's ability to compete. Accessory management can have utility in other disciplines which may not relate to gaming applications. Efficient use of accessories in these other disciplines can be important to other users.

Audio playback is an important aspect of gaming, whether during use or gaming console or other device to participate in a game. Further, audio playback can be an important aspect of other activities as well, such as viewing films or other video and audio content. The quality and verisimilitude of audio playback can affect a gamer's enjoyment of the game or a viewer's enjoyment of a film or other content.

BRIEF DESCRIPTION OF THE DRAWINGS

Reference will now be made to the accompanying drawings, which are not necessarily drawn to scale, and wherein:

FIG. 7F depicts an illustrative embodiment of the apparatus of FIG. 7B configured to provide audio data to a plurality of audio endpoints.

FIG. 7G depicts an illustrative embodiment of a fourth method utilized in the subject disclosure.

FIG. 10 depicts an illustrative diagrammatic representation of a machine in the form of a computer system within which a set of instructions, when executed, may cause the machine to perform any one or more of the methodologies disclosed herein.

DETAILED DESCRIPTION

Figure 1:
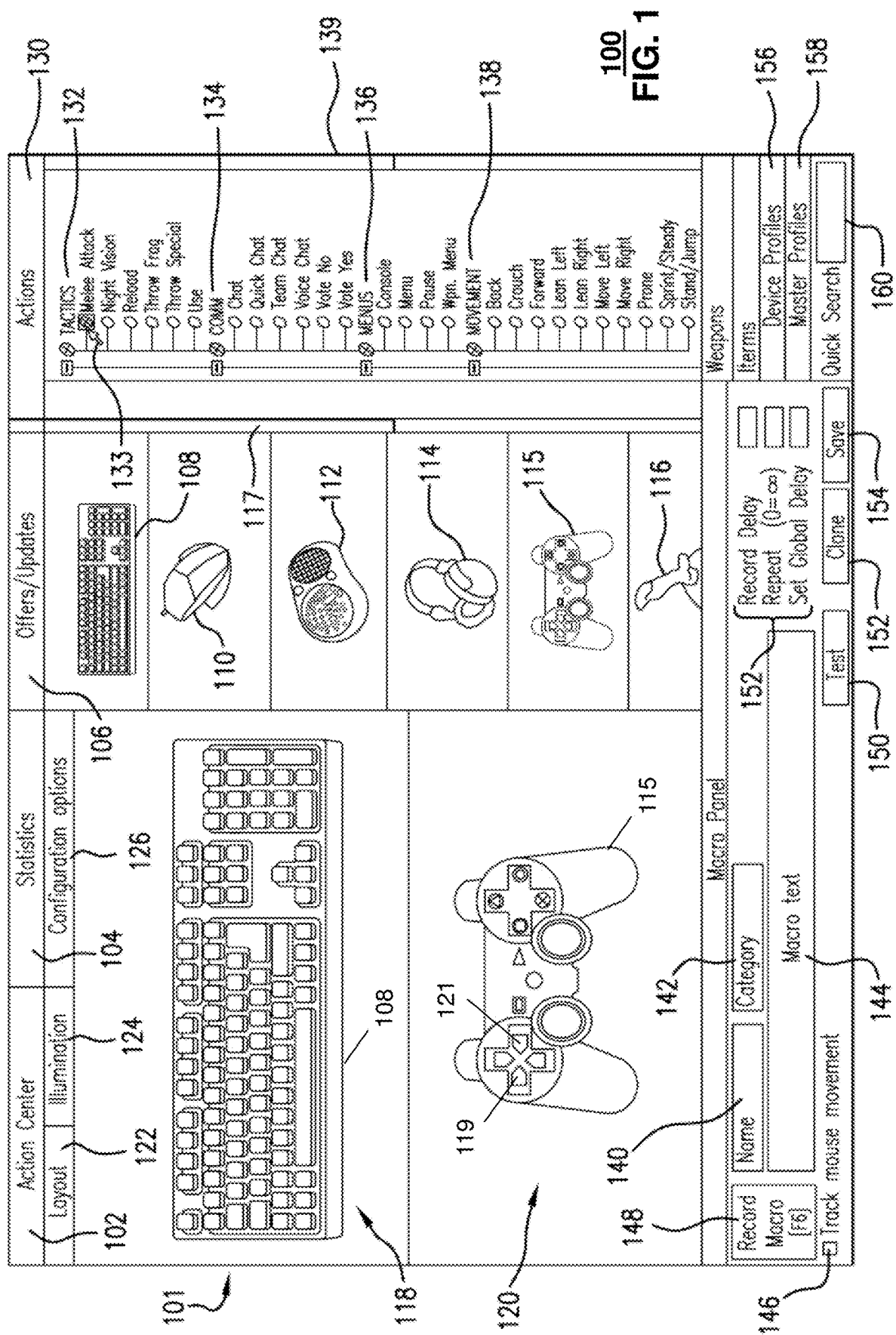
FIG. 1 depicts an illustrative embodiment of a Graphical User Interface (GUI) generated by an Accessory Management Software (AMS) application according to the present disclosure.

The subject disclosure describes, among other things, illustrative embodiments for improvement of audio playback by a computing device used by a gamer or a viewer of a film or other content item. Other embodiments are described in the subject disclosure.

One embodiment of the subject disclosure includes receiving a multichannel audio stream; forming a front channel audio stream of the multichannel audio stream, including combining a first subset of audio channels of the multichannel audio stream to form the front channel audio stream; forming a surround channel audio stream of the multichannel audio stream including combining a second subset of audio channels of the multichannel audio stream to form the surround channel audio stream; providing the front channel audio stream to a primary set of speakers positioned in front of a listener and providing the surround channel audio stream to a supplemental speaker positioned behind the listener; and synchronizing the front channel audio stream and the surround channel audio stream.

One embodiment of the subject disclosure includes receiving, from an audio sender module of an apparatus, a multichannel audio stream, duplicating the multichannel audio stream to produce a first audio stream and a second audio stream, selecting a first subset of channels of the first audio stream and combining the first subset of channels to produce a front channel audio stream, and selecting a second subset of channels of the second audio stream and combining the second subset of channels to produce a surround channel audio stream. The embodiment of the subject disclosure further includes opening a first new audio stream on an operating system of the apparatus, the first new audio stream configured to provide audio information to a right primary speaker and a left primary speaker of the apparatus, routing the front channel audio stream to the first new audio stream, opening a second new audio stream on the operating system of the apparatus, the second new audio stream configured to provide audio information to a wireless speaker in communication with the apparatus, and routing the surround channel audio stream to the second new audio stream. The embodiment further includes synchronizing the front channel audio stream and the surround channel audio stream.

One embodiment of the subject disclosure includes processing a media content item to generate a multichannel audio stream and duplicating the multichannel audio stream to produce a first audio stream and a second audio stream, the first audio stream and the second audio stream including multiple audio channels. The embodiment further includes combining respective channels of the first audio stream to form a front channel audio stream having a left audio channel and a right audio channel, providing the left audio channel and the right audio channel of the front channel audio stream to a left speaker and a right speaker, respectively, of the device, to provide front channel spatial information at a listening position. The embodiment further includes combining respective channels of the second audio stream to form a surround channel audio stream having a left surround channel and a right surround channel to provide spatial information. The embodiment further includes inverting the left surround channel and the right surround channel to provide surround channel spatial information for the listening position that matches the front channel spatial information for the listening position and providing the surround channel audio stream to a wireless speaker in radio communication with the device and positioned behind the listening position to provide a surround sound affect at the listening position.

FIG. 1 depicts an illustrative embodiment of a Graphical User Interface (GUI) generated by an Accessory Management Software (AMS) application according to the present disclosure. The AMS application can be executed by a computing device such as a desktop computer, a laptop computer, a tablet, a server, a mainframe computer, a gaming console, a gaming accessory, or any combination or portions thereof. The AMS application can also be executed by portable computing devices such as a cellular phone, a personal digital assistant, or a media player. The AMS application can be executed by any device with suitable computing and communication resources.

Figure 2:
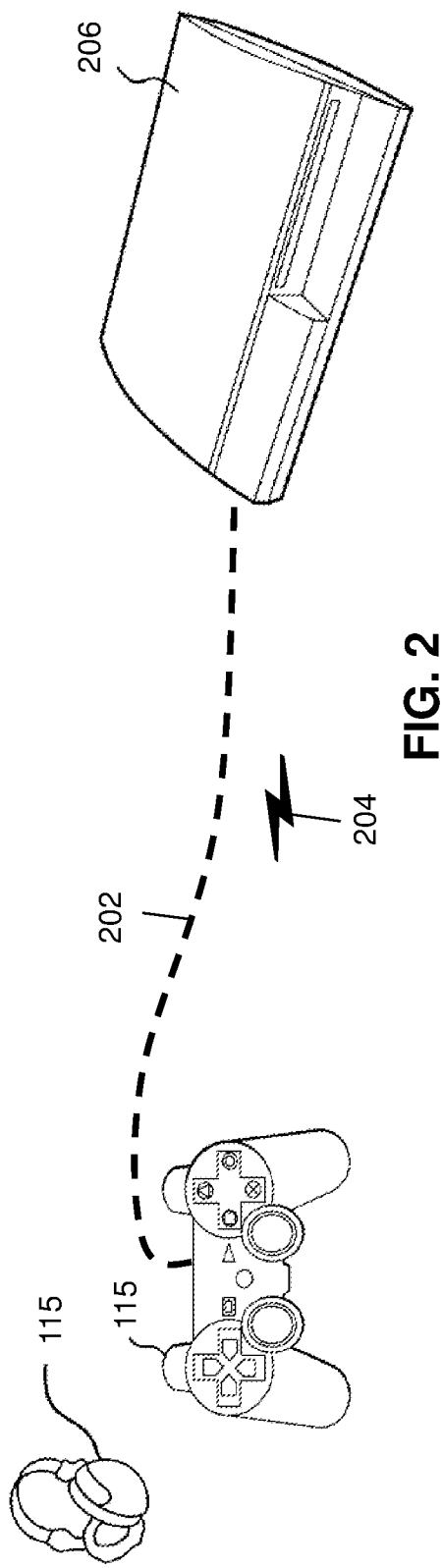
FIGS. 2-3 depict illustrative embodiments for communicatively coupling a gaming controller to a computing device.

FIG. 2 illustrates a number of embodiments for utilizing a gaming controller 115 with a computing device 206 in the form of a gaming console. In the illustration of FIG. 2, the gaming controller 115 can be communicatively coupled to the gaming console 206 with a tethered cable interface 202 such as a USB or proprietary cable, or a wireless interface 204 such as WiFi, Bluetooth, ZigBee, or a proprietary wireless communications protocol. The cable interface 202 provides a means for communication that may be less susceptible to electromagnetic interference. It will be appreciated that the gaming controller 115 may further include a headset 114 (with or without a microphone not shown) utilized by a gamer to communicate with teammates and/or to listen to game sounds in high fidelity. In the illustration of FIG. 2, the AMS application can in whole or in part be executed by the gaming controller 115, the gaming console 206, or a combination thereof.

Figure 3:
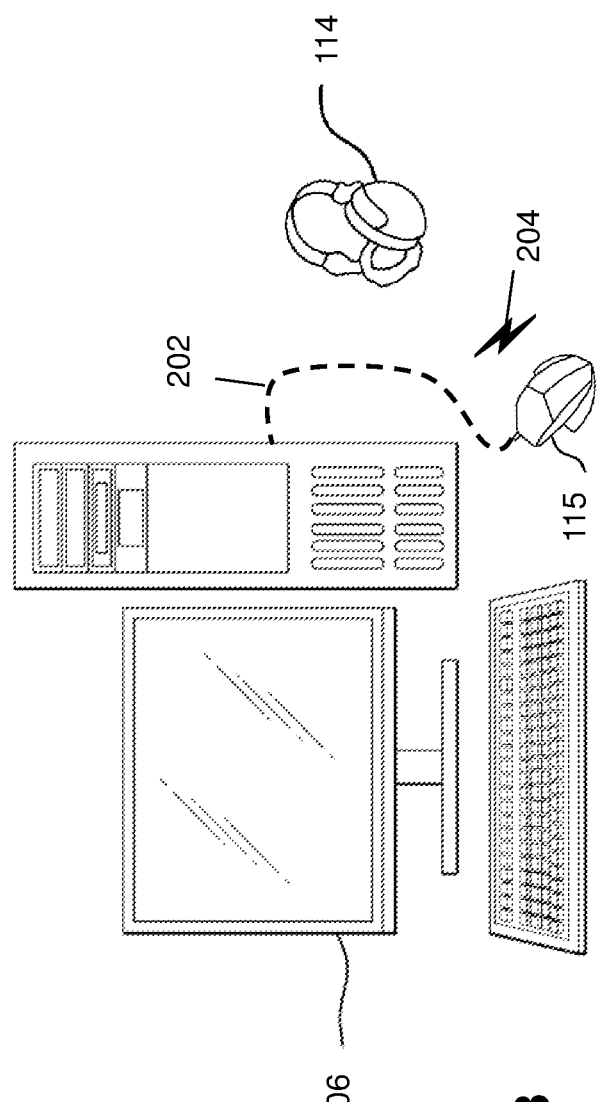

FIG. 3 illustrates a number of other embodiments for utilizing a gaming controller 115 with a computing device 206. In this embodiment, the gaming controller 115 comprises a mouse and the computing device 206 comprises a computer. The gaming controller 115 can be tethered to the computing device 206 by a cable interface 202 (e.g., USB cable or proprietary cable) or a wireless interface 204. The cable interface 202 provides a means for communication that may be less susceptible to electromagnetic interference. It will be appreciated that the gaming controller 115 may further include a headset (with or without a microphone not shown) utilized by a gamer to communicate with teammates and/or to listen to game sounds in high fidelity. In the illustration of FIG. 3, the AMS application can in whole or in part be executed by the gaming controller 115, the gaming console 206, or a combination thereof.

For illustration purposes, the terms gaming console 206 and computer 206 will be used hence forth interchangeably with the term computing device 206 with an understanding that a computing device 206 may represent a number of other devices such as a server, a tablet, a smart phone, and so on. Accordingly, a computing device 206 can represent any device with suitable computing resources to perform the methods described in the subject disclosure.

Figure 4:
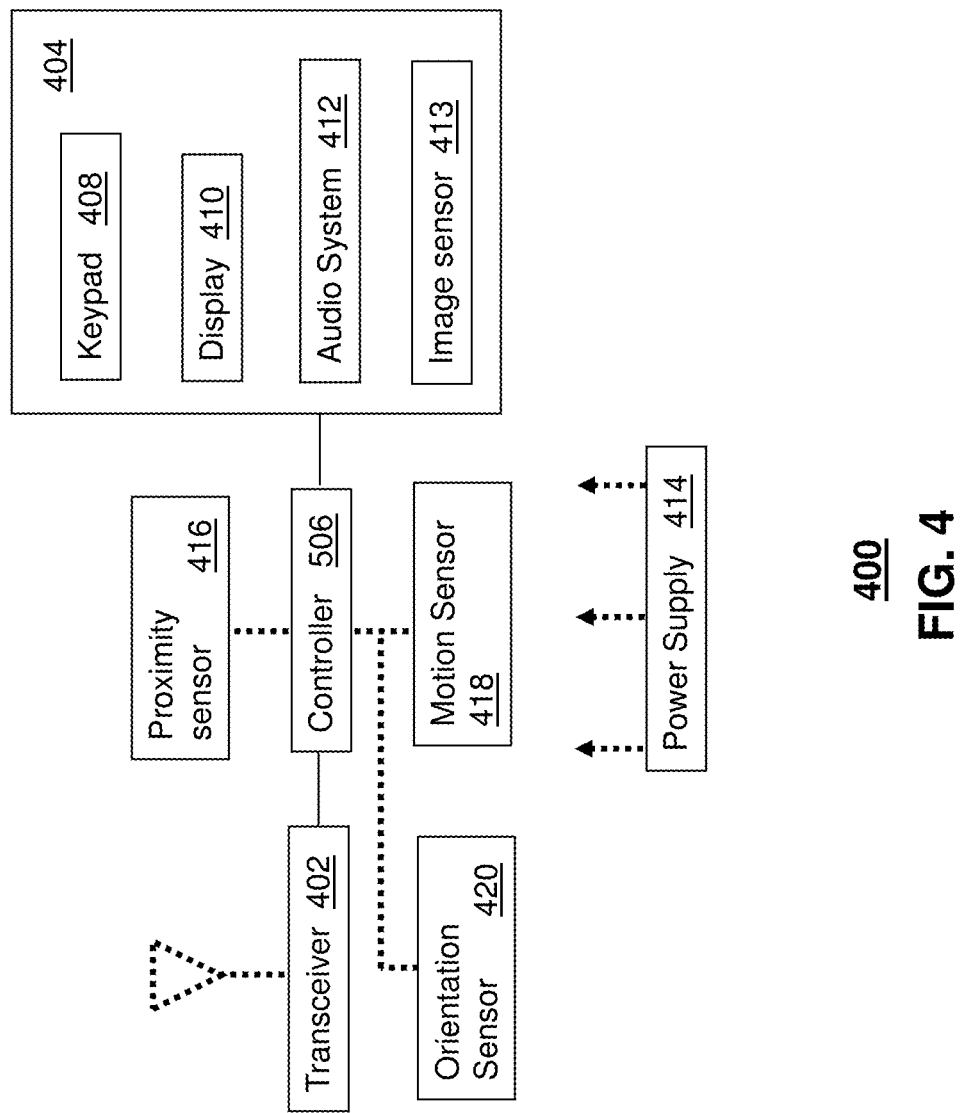
FIG. 4 depicts an illustrative embodiment of a communication device.
Figure 5:
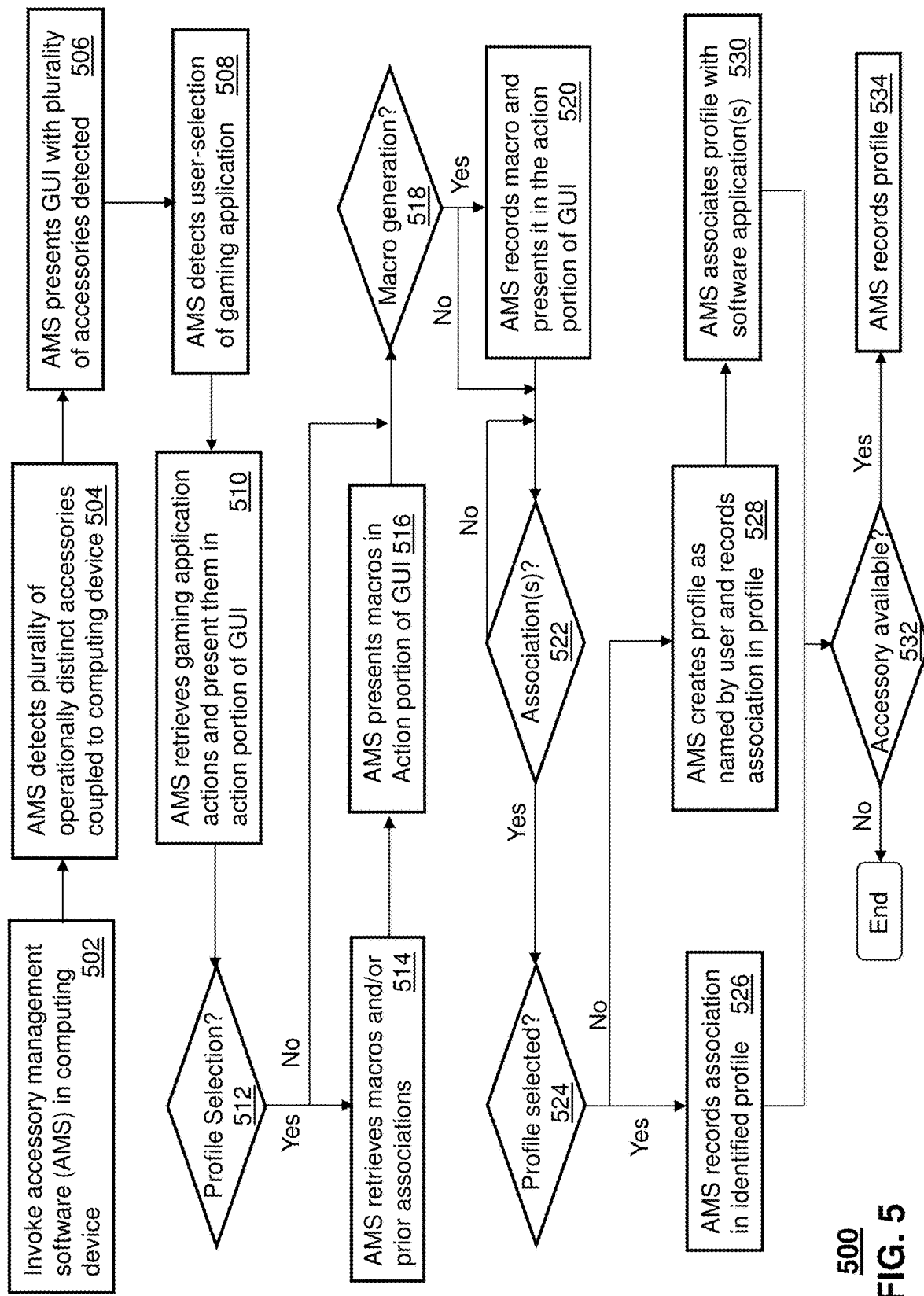
FIG. 5 depicts an illustrative embodiment of a first method utilized in the subject disclosure.

FIG. 4 depicts an illustrative embodiment of a communication device 400. Communication device 400 can serve in whole or in part as an illustrative embodiment of devices described in the subject disclosure. For example, the communication device 400 may facilitate providing a surround sound affect by providing, from a multichannel audio stream, a first audio stream at a primary set of speakers and a surround stream at a supplemental speaker such as a Bluetooth speaker. The communication device 400 can comprise a wireline and/or wireless transceiver 402 (herein transceiver 402), a user interface (UI) 404, a power supply 414, a proximity sensor 416, a motion sensor 418, an orientation sensor 420, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1x, UMTS/HSDPA, GSM/GPRS, TDMA/EDGE, EV/DO, WiMAX, software defined radio (SDR), Long Term Evolution (LTE), as well as other next generation wireless communication technologies as they arise. The transceiver 402 can also be adapted to support circuit-switched wireline access technologies (such as PSTN), packet-switched wireline access technologies (such as TCP/IP, VoIP, etc.), and combinations thereof.

The UI 404 can include a depressible or touch-sensitive keypad 408 coupled to a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric keypad, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400.

In an embodiment where the display 410 utilizes touch-sensitive technology, a portion or all of the keypad 408 can be presented by way of the display 410 with navigation features. As a touch screen display, the communication device 400 can be adapted to present a user interface with graphical user interface (GUI) elements that can be selected by a user with a touch of a finger. The touch screen display 410 can be equipped with capacitive, resistive or other forms of sensing technology to detect how much surface area of a user's finger has been placed on a portion of the touch screen display. This sensing information can be used to control the manipulation of the GUI elements.

The UI 404 can also include an audio system 412 that utilizes common audio technology for conveying low volume audio (such as audio heard only in the proximity of a human ear) and high-volume audio (such as speakerphone for hands free operation, stereo or surround sound system). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images and performing image recognition therefrom.

The power supply 414 can utilize common power management technologies such as replaceable or rechargeable batteries, supply regulation technologies, and charging system technologies for supplying energy to the components of the communication device 400 to facilitate long-range or short-range portable applications. Alternatively, the charging system can utilize external power sources such as DC power supplied over a physical interface such as a USB port or by way of a power cord attached to a transformer that converts AC to DC power.

The proximity sensor 416 can utilize proximity sensing technology such as an electromagnetic sensor, a capacitive sensor, an inductive sensor, an image sensor or combinations thereof. The motion sensor 418 can utilize motion sensing technology such as an accelerometer, a gyroscope, or other suitable motion sensing technology to detect movement of the communication device 400 in three-dimensional space. The orientation sensor 420 can utilize orientation sensing technology such as a magnetometer to detect the orientation of the communication device 400 (North, South, West, East, combined orientations thereof in degrees, minutes, or other suitable orientation metrics).

The communication device 400 can use the transceiver 402 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such as Flash, ROM, RAM, SRAM, DRAM or other storage technologies.

The communication device 400 as described herein can operate with more or less components described in FIG. 4 to accommodate the implementation of devices described by the subject disclosure. These variant embodiments are contemplated by the subject disclosure.

FIGS. 5-7A depict methods 500-700 describing illustrative embodiments of the AMS application. Method 500 can begin with step 502 in which the AMS application is invoked in a computing device. The computing device can be a remote server (not shown), the gaming console 206 or computer 206 of FIGS. 2-3, or any other computing device with suitable computing resources. The invocation step can result from a user selection of the AMS application from a menu or iconic symbol presented by the computing device 206, or when a user communicatively couples a gaming controller 115 or other form of accessory device with the computing device 206. In step 504, the AMS application can detect by way of software drivers in an operating system (OS) of the computing device 206 a plurality of operationally distinct accessories communicatively coupled to the computing device 206. The accessories can be coupled to the computing device 206 by a tethered interface (e.g., USB cable), a wireless interface (e.g., Bluetooth or Wireless Fidelity—WiFi), or combinations thereof.

In the present context, an accessory can represent any type of device which can be communicatively coupled to the computing device 206 (or which can be an integral part of the computing device) and which can control aspects of the OS and/or a software application operating from the computing device 206. An accessory can represent for example a keyboard, a touch screen display, a gaming pad, a gaming controller, a mouse, a joystick, a microphone, or a headset with a microphone—just to mention a few.

In step 506, the AMS application presents a GUI 101 such as depicted in FIG. 1 depicting operationally distinct accessories such as a keyboard 108, and a gaming controller 115. The GUI 101 presents the accessories 108-116 in a scrollable section 117. One or more accessories can be selected by a user with a mouse pointer. In this illustration, the keyboard 108 and the gaming controller 115 were selected for customization. Upon selecting the keyboard 108 and the gaming controller 115 from the scrollable window of section 117, the AMS application presents the keyboard 108 and the gaming controller 115 in split windows 118, 120, respectively, to assist the user during the customization process.

In step 508, the AMS application can be programmed to detect a user-selection of a particular software application such as a video game. This step can be the result of the user entering in a Quick Search field 160 the name of a gaming application (e.g., World of Warcraft™ or WoW). Upon identifying a gaming application, the AMS application can retrieve in step 510 from a remote or local database gaming application actions which can be presented in a scrollable section 139 of the GUI represented as "Actions" 130. The actions can be tactical actions 132, communication actions 134, menu actions 136, and movement actions 138 which can be used to invoke and manage features of the gaming application.

The actions presented descriptively in section 130 of the GUI can represent a sequence of accessory input functions which a user can stimulate by button depressions, navigation or speech. For example, depressing the left button on the mouse 110 can represent the tactical action "Reload", while the simultaneous keyboard depressions "Ctrl A" can represent the tactical action "Melee Attack". For ease of use, the "Actions" 130 section of the GUI is presented descriptively rather than by a description of the input function(s) of a particular accessory.

Any one of the Actions 130 can be associated with one or more input functions of the accessories being customized in windows 118 and 120 by way of a drag and drop action or other customization options. For instance, a user can select a "Melee Attack" by placing a mouse pointer 133 over an iconic symbol associated with this action. Upon doing so, the symbol can be highlighted to indicate to the user that the icon is selectable. At this point, the user can select the icon by holding the left mouse button and drag the symbol to any of the input functions (e.g., buttons) of the keyboard 108 or selectable options of the gaming controller 115 to make an association with an input function of one of these accessories. Actions of one accessory can also be associated with another accessory that is of a different category. For example, key depressions "Ctrl A" of the keyboard 108 can be associated with one of the buttons of the gaming controller 115 (e.g., the left button 119).

In one embodiment, a Melee Attack action can be associated by dragging this action to either the left button 119 or right button 121 of the gaming controller 115. Thus, when the selected button is depressed, the stimulus signal that is generated by the selected button of the gaming controller 115 can be substituted by the AMS application with the Melee Attack action. In another embodiment, the AMS application can be configured so that the Melee Action can be associated with a combination of key button presses (e.g., simultaneous depression of the left and right buttons 119, 121, or a sequence of button depressions: two rapid left button depressions followed by a right button depression).

In yet another embodiment, the AMS application can be configured so that the Melee Action can be associated with movement of the gaming controller 115 such as, for example, rapid movement or shaking of the gaming controller 115. In a further embodiment, the AMS application can be adapted to make associations with two dimensional or three-dimensional movements of the gaming controller 115 according to a gaming venue state. For example, suppose the player's avatar enters a fighter jet. In this gaming venue state, moving the left navigation knob forward can be associated by the AMS application with controlling the throttle of the jet engines. Rapidly moving the gaming controller 115 downward can represent release of munitions such as a bomb.

In a gaming venue state where the gamer's avatar has entered a building, lifting of the gaming controller 115 above a first displacement threshold can be associated with a rapid movement of the avatar up one floor. A second displacement threshold can be associated with a rapid movement of the avatar down one floor—the opposite of the first displacement threshold. Alternatively, the second displacement threshold could be associated with a different action such as jumping between buildings when the avatar is on the roof of a building.

The AMS application can monitor gaming venue states by analyzing captured images produced by the gaming application (e.g., one or more still images of a tank, or a video of an avatar entering a tank), and/or by receiving messages from the gaming application by way of an application programming interface (API) thereby enabling the AMS application to identify the occurrence of a particular gaming venue state.

At step 512 the AMS application can also respond to a user selection of a profile. A profile can be a device profile or master profile invoked by selecting GUI button 156 or 158, each of which can identify the association of gaming actions with input functions of one or more accessories. If a profile selection is detected in step 512, the AMS application can retrieve in step 514 macro(s) and/or prior associations defined by the profile. The actions and/or macros defined in the profile can also be presented in step 516 by the AMS application in the actions column 130 of the GUI 101 to modify existing profile associations or create new associations.

In step 518, the AMS application can also respond to a user selection to create a macro. A macro in the present context can mean any actionable command which can be recorded by the AMS application. An actionable command can represent a sequence of stimuli generated by manipulating input functions of an accessory, a combination of actions in the Action section 130, an identification of a software application to be initiated by the OS of the computing device 206, or any other recordable stimulus to initiate, control or manipulate software applications. For instance, a macro can represent a user entering the identity of a software application (e.g., instant messaging tool) to be initiated by the OS upon the AMS application detecting a speech command using speech recognition technology.

A macro can also represent recordable speech delivered by a microphone singly or in combination with a headset for detection by another software application through speech recognition or for delivery of the recorded speech to other parties. In yet another embodiment a macro can represent recordable navigation of an accessory such as a joystick of the gaming controller 115, recordable selections of buttons of the gaming controller 115, and so on. Macros can also be combinations of the above illustrations with selected actions from the Actions 130 menu. Macros can be created from the GUI 101 by selecting a "Record Macro" button 148. The macro can be given a name and category in user-defined fields 140 and 142.

Upon selecting the Record Macro button 148, a macro can be generated by selection of input functions on an accessory (e.g., Ctrl A, speech, navigation knob movements of the gaming controller 115, etc.) and/or by manual entry in field 144 (e.g., typing the name and location of a software application to be initiated by an OS, such as an instant messaging application, keyboard entries such as Ctrl A, etc.). Once the macro is created, it can be tested by selecting button 150 which can repeat the sequence specified in field 144. The clone button 152 can be selected to replicate the macro sequence if desired. Fields 152 can also present timing characteristics of the stimulation sequence in the macro with the ability to modify and thereby customize the timing of one or more stimulations in the stimulation sequence. Once the macro has been fully defined, selection of button 154 records the macro in step 520. The recording step can be combined with a step for adding the macro to the associable items Actions column 130, thereby providing the user the means to associate the macro with input functions of the accessories (e.g., one or more keys of the keyboard 108, buttons of the gaming controller 115, etc.).

In step 522, the AMS application can respond to drag and drop associations of actions with input functions of the keyboard 108 or the gaming controller 115. Associations can also be made based on the two or three dimensional movements of the gaming controller 115. If user input indicates that a user is performing an association, the AMS application can proceed to step 524 where it can determine if a profile has been identified in step 512 to record the association(s) detected. If a profile has been identified, the associations are recorded/stored in the profile in step 526. If a profile has not been identified in step 512, the AMS application can create a profile in step 528 for recording the detected associations. In the same step, the user can name the newly created profile as desired. The newly created profile can also be associated with one or more gaming software applications in step 530 for future reference. The AMS application can also record in a profile in step 526 associations based on gaming venue states. In this embodiment the same stimuli generated by the gaming controller 115 can result in different substitutions based on the gaming venue state detected by the AMS application.

Referring back to step 526, once the associations have been recorded in a profile, the AMS application can determine in step 532 which of the accessories shown illustratively in FIGS. 1-3 are programmable and available for programming. If the AMS application detects that an accessory (e.g., keyboard 108, gaming controller 115) is communicatively coupled to the computing device 206 and determines that the accessory is capable of performing stimulus substitutions locally, the AMS application can proceed to step 534 of FIG. 5 where it submits the profile and its contents for storage in the accessory (e.g., the gaming controller 115 in FIGS. 2-3). Once the accessory (e.g., the gaming controller 115) is programmed with the profile, the accessory can perform stimulus substitutions according to the associations recorded by the AMS application in the profile. Alternatively, the AMS application can store the profile in the computing device 206 of FIGS. 2-3 and perform substitutions of stimuli supplied by the gaming controller 115 according to associations recorded in the profile by the AMS application.

The GUI 101 of FIG. 1 presented by the AMS application can have other functions. For example, the GUI 101 can present a layout of the accessory (button 122), how the accessory is illuminated when associations between input functions and actions are made (button 124), and configuration options for the accessory (button 126). The AMS application can adapt the GUI 101 to present more than one functional GUI page. For instance, by selecting button 102, the AMS application can adapt the GUI 101 to present a means to create macros and associate actions to accessory input functions as depicted in FIG. 1. Selecting button 104 can cause the AMS application to adapt the GUI 101 to present statistics from stimulation information and/or gaming action results captured by the AMS application as described in the subject disclosure. Selecting button 106 can also cause the AMS application to adapt the GUI 101 to present promotional offers and software updates.

The steps of method 500 in whole or in part can be repeated until a desirable pattern is achieved of associations between stimulus signals generated by accessories and substitute stimuli. It would be apparent to an artisan with ordinary skill in the art that there can be numerous other approaches to accomplish the embodiments described by method 500 or variants thereof. These undisclosed approaches are contemplated by the subject disclosure.

Figure 6:
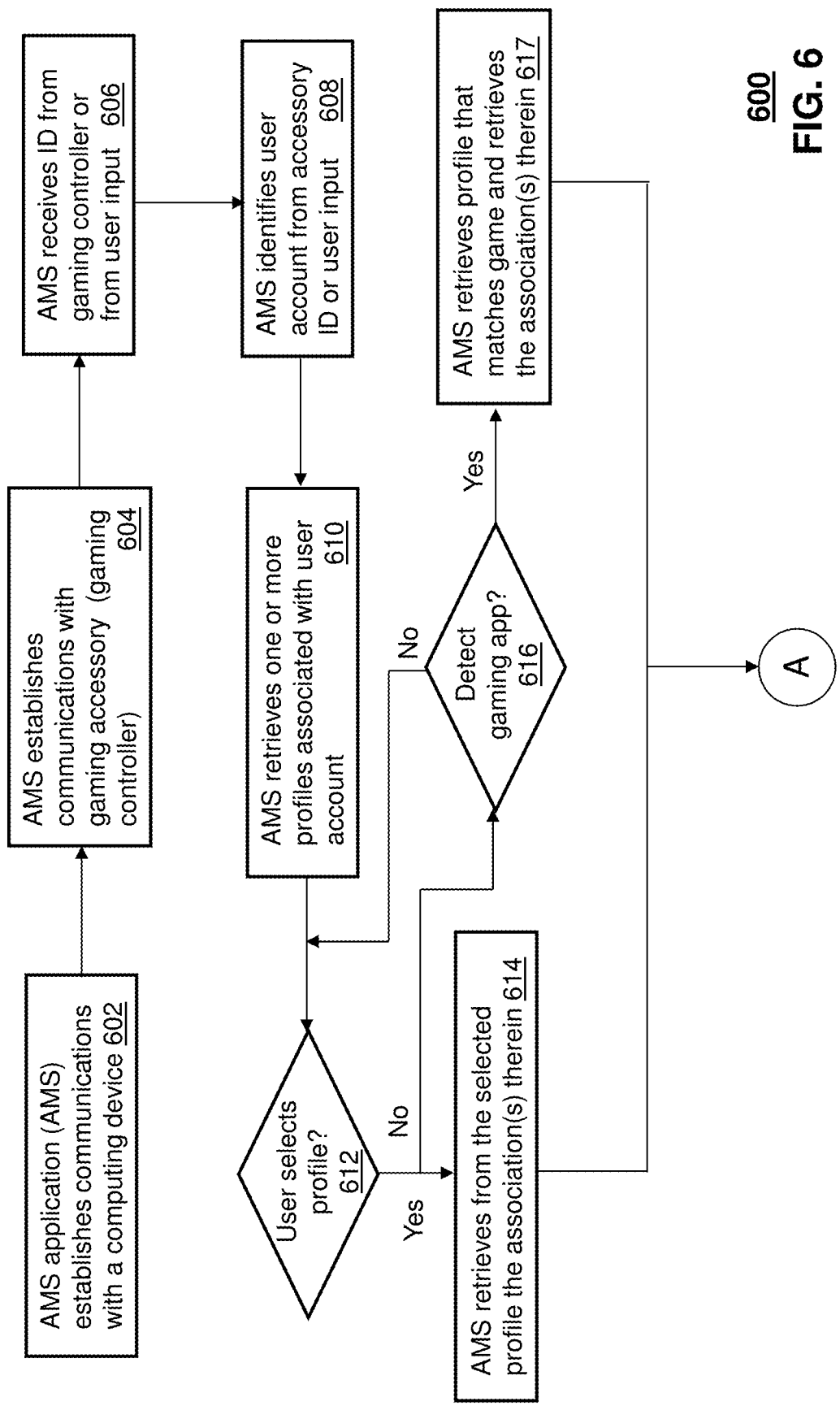
FIG. 6 depicts an illustrative embodiment of a second method utilized in the subject disclosure.

FIG. 6 depicts a method 600 for illustrating additional operations of the AMS application. In the configurations of FIGS. 2-3, the AMS application can be operating in whole or in part from the gaming controller 115, a gaming console 206, a computer 206, or a remote server (not shown). For illustration purposes, it is assumed the AMS application operates from the gaming console 206. Method 600 can begin with the AMS application establishing communications in steps 602 and 604 between the gaming console 206 and a gaming accessory such as the gaming controller 115, and a headset 114 such as shown in FIG. 1. These steps can represent for example a user starting the AMS application from the gaming console 206 and/or the user inserting at a USB port of the gaming console 206 a connector of a USB cable tethered to the gaming controller 115, which invokes the AMS application. In step 606, the gaming controller 115 and/or headset 114 can in turn provide the AMS application one or more accessory ID's, or the user can provide by way of a keyboard or the gaming controller 115 user identification. With the accessory ID's, or user input the AMS application can identify in step 608 a user account associated with the gaming controller 115 and/or headset 114. In step 610, the AMS application can retrieve one or more profiles associated with the user account.

In step 612, the user can be presented by way of a display coupled to the gaming console 206 profiles available to the user to choose from. If the user makes a selection, the AMS application proceeds to step 614 where it retrieves from the selected profiles the association(s) stored therein. If a selection is not made, the AMS application can proceed to step 616 where it can determine whether a software gaming application (e.g., video game) is operating from the gaming console 206 or whether the gaming console 206 is communicating with the software gaming application by way of a remote system communicatively coupled to the gaming console 206 (e.g., on-line gaming server(s) presenting, for example, World of Warcraft™). If a gaming software application is detected, the AMS application proceeds to step 617 where it retrieves a profile that matches the gaming application detected and the association(s) contained in the profile. As noted earlier, association(s) can represent accessory stimulations, navigation, speech, the invocation of other software applications, macros or other suitable associations that result in substitute stimulations. The accessory stimulations can be stimulations that are generated by the gaming controller 115, as well as stimulations from other accessories (e.g., headset 114), or combinations thereof.

Once a profile and its contents have been retrieved in either of steps 614 or step 617, the AMS application can proceed to step 719 of FIG. 7 where it monitors for a change in a gaming venue state based on the presentations made by the gaming application, or API messages supplied by the gaming application. At the start of a game, for example, the gaming venue state can be determined immediately depending on the gaming options chosen by the gamer. The AMS application can determine the gaming venue state by tracking the gaming options chosen by a gamer, receiving an API instruction from the gaming application, or by performing image processing on the video presentation generated by the gaming application. For example, the AMS application can detect that the gamer has directed an avatar to enter a tank. The AMS application can retrieve in step 719 associations for the gaming controller 115 for controlling the tank.

The AMS application can process movements of the gaming controller 115 forwards, backwards, or sideways in two or three dimensions to control the tanks movement. Similarly, rotating the gaming controller 115 or tilting the gaming controller 115 forward can cause an accelerometer, gyro or magnetometer of the gaming controller 115 to provide navigational data to the AMS application which can be substituted with an action to cause the tank to turn and/or move forward. The profile retrieved by the AMS application can indicate that the greater the forward tilt of the gaming controller 115, the greater the speed of the tank should be moving forward. Similarly, a rear tilt can generate navigation data that is substituted with a reverse motion and/or deceleration of the forward motion to stop or slow down the tank. A three dimensional lift of the mouse can cause the tank to steer according to the three dimensional navigation data provided by the gaming controller 115. For example, navigation data associated with a combination of a forward tilt and right bank of the gaming controller 115 can be substituted by the AMS application to cause an increase in forward speed of the tank with a turn to the right determined by the AMS application according to a degree of banking of the gaming controller 115 to the right. In the above embodiment, the three dimensional navigation data allows a gamer to control any directional vector of the tank including speed, direction, acceleration and deceleration.

In another illustration, the AMS application can detect a new gaming venue state as a result of the gamer directing the avatar to leave the tank and travel on foot. Once again the AMS application retrieves in step 719 associations related to the gaming venue state. In this embodiment, selection of buttons of the gaming controller 115 can be associated by the AMS application with weaponry selection, firing, reloading and so on. The movement of the gaming controller 115 in two or three dimensions can control the direction of the avatar and/or selection or use of weaponry. Once the gaming venue state is detected in step 719, the AMS application retrieves the associations related to the venue state and can perform substitutions of stimuli generated by the gaming controller 115, and/or speech commands received by microphone of the headset 114.

In one embodiment, the AMS application can be configured in step 719 to retrieve a profile that provides substitute stimuli for replacing certain stimuli generated by accessories. The associations recorded in the profile can be venue independent. In another embodiment, the AMS application can retrieve a combination of profiles, where one or more profiles provide substitute stimuli that are venue dependent and one or more other profiles provide substitute stimuli that are venue independent.

The AMS application can monitor in step 720 stimulations generated by the accessories coupled to the gaming console 206. The stimulations can be generated by the gamer manipulating the gaming controller 115, and/or by generating speech commands detected by a microphone of the headset 114. If a stimulation is detected at step 720, the AMS application can determine in step 722 whether to forward the detected stimulation(s) to an Operating System (OS) of the gaming console 206 or the gaming application directly without substitutions. This determination can be made by comparing the detected stimulation(s) to corresponding associations in one or more profiles retrieved by the AMS application. If the detected stimulation(s) match the associations, then the AMS application proceeds to step 740 where it retrieves substitute stimulation(s) in the profile(s). In step 742, the AMS application can substitute the detected stimulation(s) with the substitute stimulations in the profile(s).

In one embodiment, the AMS application can track in step 744 the substitute stimulations by updating the stimulations with a unique identifier such as a globally unique identifier (GUID). In this embodiment, the AMS application can also add a time stamp to each substitute stimulation to track when the substitution was performed. In another embodiment, the AMS application can track each substitute stimulation according to its order of submission to the gaming application. For instance, sequence numbers can be generated for the substitute stimulations to track the order in which they were submitted to the gaming application. In this embodiment, the substitute stimulations do not need to be updated with sequence numbers or identifiers so long as the order of gaming action results submitted by the gaming application to the AMS application remain in the same order as the substitute stimulations were originally submitted.

For example, if a first stimulation sent to the gaming application by the AMS application is a command to shoot, and a second stimulation sent to the gaming application is a command to shoot again, then so long as the gaming application provides a first a game action result for the first shot, followed by a game action result for the second shot, then the substitute stimulations will not require updating with sequence numbers since the game action results are reported in the order that the stimulations were sent. If on the other hand, the game action results can be submitted out of order, then updating the stimulations with sequence numbers or another suitable identifier would be required to enable the AMS application to properly track and correlate stimulations and corresponding gaming action results.

Referring back to step 722, if the detected stimulation(s) do not match an association in the profile(s), then the AMS application proceeds to one of steps 744 or 746 in order to track the stimulations of the accessory as described above.

Figure 7A:
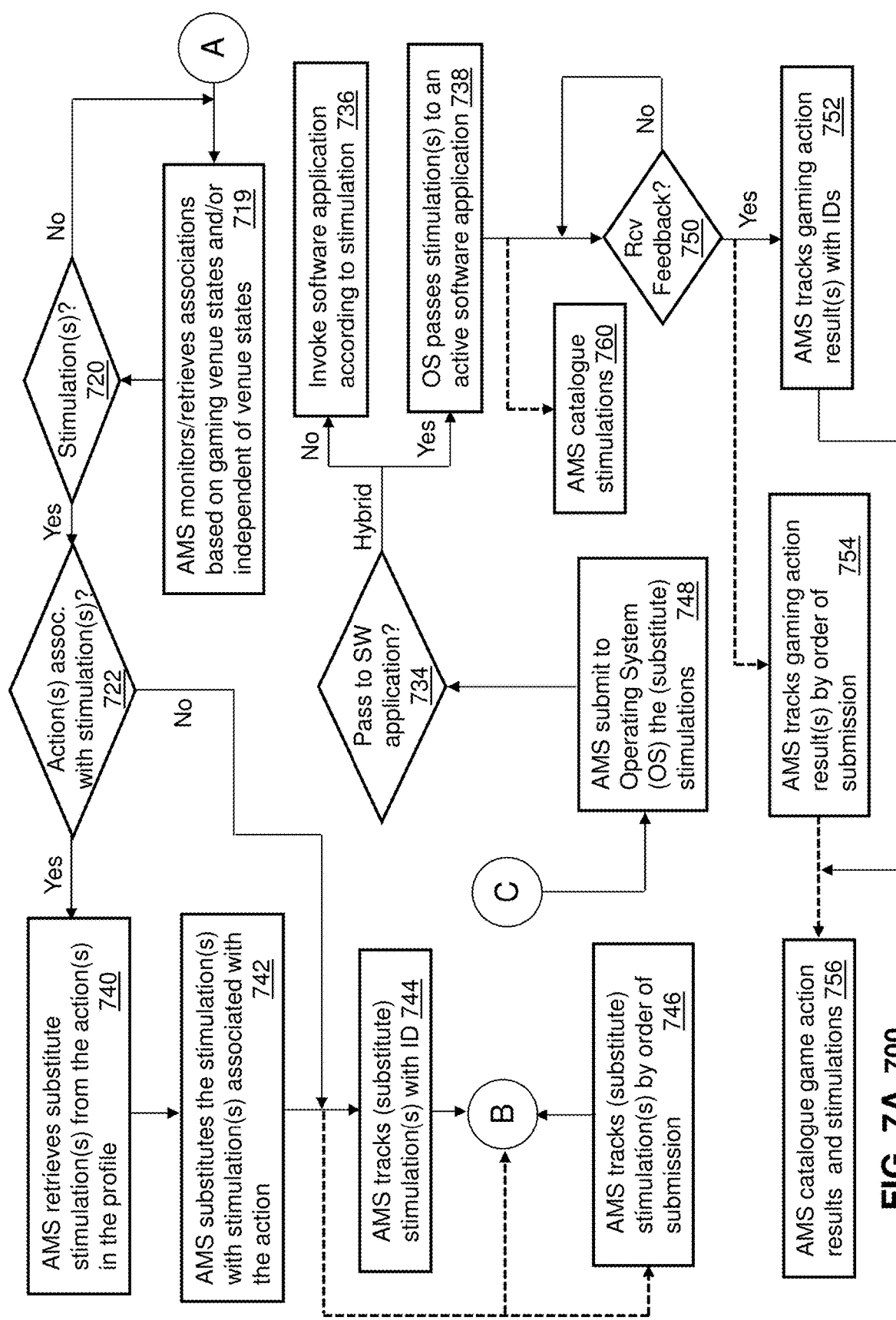
FIG. 7A depicts an illustrative embodiment of a third method utilized in the subject disclosure.
Figure 7B:
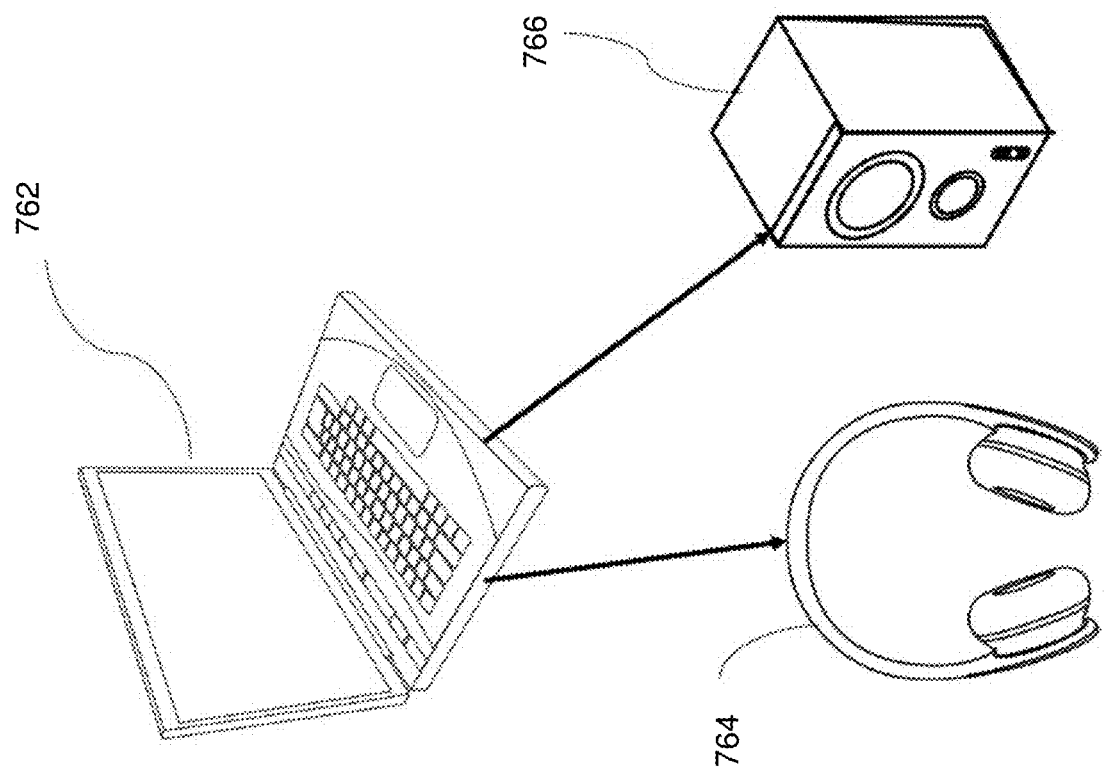
FIG. 7B depicts an illustrative embodiment of an apparatus connected to multiple audio rendering devices.

Once the AMS application at step 748 supplies to the OS of the computing device 206 a gaming action (i.e., one or more stimulations) from the method of FIG. 7B, the AMS application can proceed to step 734. The gaming action supplied to the OS at step 748 can be the unadulterated "original" gaming action of step 720, or an alternative gaming action generated by steps 744 or 746. At step 734, the OS determines whether to invoke in step 736 a software application identified in the stimulation(s) (e.g., gamer says "turn on team chat", which invokes a chat application), whether to forward the received stimulation(s) to the gaming software application in step 738, or combinations thereof.

Contemporaneous to the embodiments described above, the AMS application can monitor in step 750 for game action results supplied by the gaming application via API messages previously described. For instance, suppose the stimulation sent to the gaming application in step 738 is a command to shoot a pistol. The gaming application can determine that the shot fired resulted in a miss of a target or a hit. The gaming application can respond with a message which is submitted by way of the API to the AMS application that indicates the shot fired resulted in a miss or a hit. If IDs such as GUIDs were sent with each stimulation, the gaming application can submit game action results with their corresponding GUID to enable the AMS application to correlate the gaming action results with stimulations having the same GUID.

For example, if the command to shoot included the ID "1234", then the game action result indicating a miss will include the ID "1234", enabling the AMS application in step 752 to correlate the game action result to the stimulation having the same ID. If on other hand, the order of game action results can be maintained consistent with the order of the stimulations, then the AMS application can correlate in step 754 stimulations with game action results by the order in which stimulation were submitted and the order in which game action results are received. In step 756, the AMS application can catalogue stimulations and game action results. In another embodiment, the AMS application can be adapted to catalogue the stimulations in step 760. In this embodiment, step 760 can be performed as an alternative to steps 750 through 756. In another embodiment, step 760 can be performed in combination with steps 750 through 756 in order to generate a catalogue of stimulations, and a catalogue for gaming action results correlated to the stimulations.

FIG. 7B depicts an illustrative embodiment of an apparatus 762 connected to multiple audio rendering devices. FIG. 7B shows an example of an apparatus 762 for providing audio data, illustrated as a laptop computer, sending audio data to two audio logical devices. The two audio logical devices in the example embodiment include a headphone 764 and a loudspeaker 766. Each audio logical device is associated with an audio endpoint of the apparatus 762 through which the audio logical device receives the audio data. The apparatus 762 may facilitate providing a virtual surround sound affect by generating, from a multichannel audio stream, a first audio stream at a primary set of speakers such as built-in speakers of the apparatus 762 and a surround stream at a supplemental speaker such as a Bluetooth speaker, loudspeaker 766.

The apparatus 762 in exemplary embodiments includes one or more processing systems, each processing system including a processor and a memory. The memory may store data and instructions for controlling operation of the apparatus 762. In the example illustration, the apparatus 762 is configured as a laptop computer. The laptop computer includes a keyboard and touchpad surface for input control by an operator. The laptop computer may further include a microphone for audio input by the operator. The laptop computer includes a display for visual output and speakers for audio output to the operator.

The apparatus 762, such as a laptop computer, may be supplemented with one or more accessories for improved experience and convenience for the operator. Exemplary accessories include a gaming controller such as gaming controller 115 (FIG. 2) and a larger or enhanced display which may be a physically separate device. Other exemplary accessories include the headphone 764 and a loudspeaker 766, which form audio logical devices.

The apparatus 762 may provide audio data to one or more audio logical devices. Examples of the audio logical devices include the built-in speakers of the laptop computer forming the apparatus 762, the headphone 764 and the loudspeaker 766. Other embodiments may include other types of audio logical devices, such as other types of speaker systems. The audio logical devices, including the headphone 764 and the loudspeaker 766, may be in data communication with the apparatus 762 by any suitable electrical or logical connection. In an example, the audio logical device may be connected over a plug-in wire connection between the audio logical device and the apparatus 762. In another example, the audio logical device may be coupled over a wireless connection between the apparatus 762 and the audio logical device. Examples of suitable wireless technologies include Wireless Fidelity (Wi-Fi) and Bluetooth® wireless technologies. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers and accessories to each other, to the Internet, and to wired networks (which can use IEEE 802.3 or Ethernet). Wi-Fi networks operate in the unlicensed 2.4 GHz and 5 GHz radio bands for example or with products that contain both bands (dual band), so the networks can provide real-world performance similar to the basic 10BaseT wired Ethernet networks used in many offices. Bluetooth is generally a short-range wireless technology standard used for exchanging data between a fixed device and a mobile device. Bluetooth devices operation in the 2.4 GHz and 2.5 GHz industrial, scientific and medical (ISM) band of unlicensed spectrum and uses spread-spectrum frequency hopping for communication of data packets. The audio logical devices represent logical destinations for audio data produced by the apparatus 762.

One or more processing systems of the apparatus operates to implement an application program on the apparatus 762. For example, the apparatus 762 may implement a game such as an on-line game or competitive game in a team or individual configuration. A gamer may not have access to a gaming controller such as gaming controller 115 and may use input devices of the laptop computer for gaming input. Alternatively, the laptop computer or other apparatus 762 may cooperate with a gaming controller such as gaming controller 115. Video display of the game may be provided on the built-in display of the laptop computer, or may be provided to a separate, detached display such as goggles or a headset worn by the user.

In another example application, the apparatus 762 may implement a video player or may play audio and display video from any suitable source. Example sources include a file obtained from the internet or other network source and an encoded file retrieved by a processing system of the apparatus 762 from memory. Such an apparatus 762, implementing a video player in conjunction with multiple speakers and surround sound audio, may provide a home theater experience.

As the processing system of the apparatus 762 implements an application, audio may be generated in response to the application. For example, if the application is a game, the audio may be game-related sounds intended for playback to be heard by the gamer to enhance the gamer's enjoyment and experience of the game. The audio may include game sounds, music and voice communications from other gamers. In another example, if the application is a video or other content item, the audio may include music, spoken dialog and other sounds.

The audio data and other information produced by an application playing on a processing system of the apparatus 762 is provided to one or more audio logical devices. In the example of FIG. 7B, the audio logical devices include the headphone 764 and the loudspeaker 766. In an embodiment, the audio logical devices appear to the processing system as an address or other destination in the memory space of the processing system to which audio data is written. In some example embodiments, suitable types of audio encoding and audio decoding may be applied to the audio data produced by the processing system according to the application running on the processing system.

Some applications produce stereo sound. Stereo or stereophonic sound consists of two separate audio channels or tracks of sound reproduced by two speakers. The stereo channels are conventionally designated left (L) and right (R). Stereo sound provides a sense of directionality because different sounds can be heard from two different directions.

Some applications produce surround sound audio. For example, surround sound audio may include techniques for enriching the fidelity and depth of sound reproduction by using multiple audio channels from multiple speakers that surround the listener, referred to as surround channels. Surround sound audio may use four to seven or more independent audio channels and speakers placed in front of and behind the listener in order to surround the listener with sound. Surround sound audio may be produced according to a standard which specified encoding and decoding of audio data. One example of a surround sound standard is referred to as 5.1 surround. The 5.1 standard calls for six speakers including center (C) in front of the listener; front left (FL) and front right (FR) in front of the listener at angles of thirty degrees off center to the listener; left surround (Ls) and right surround (Rs) at angles of 100 to 120 degrees off center to the listener; and a subwoofer, the position of which is not specified. The 5.1 surround sound standard is published as Recommendation ITU-R BS.775-3 (August 2012 by the International Telecommunications Union (ITU). Another example of surround sound is referred to as 7.1 surround sound. 7.1 surround sound is similar to 5.1 surround sound but with four surround channels instead of two, the rear left (RL) and rear right (RR) at angles of 135 to 150 degrees off center to the listener; the side left (SL) and side right (SR) at angles of 90 to 110 degrees off center to the listener. The 7.1 surround sound standard is published as Report ITU-R BS.2159-7, February 2015, by the ITU.

Surround sound audio is typically directed to a listener position where the audio effects work best. The surround sound encoding presents a fixed or forward perspective of the sound field to the listener at this location. The technique enhances the perception of sound spatialization by exploiting sound localization. Sound localization refers to a listener's ability to identify the location or origin of a detected sound in direction and distance. In a surround sound system, sound localization is achieved by using multiple discrete audio channels routed to an array of loudspeakers. Each respective audio channel is routed to a respective loudspeaker.

Multi-channel or surround sound audio can enhance the enjoyment for a listener. This is particularly true for a listener enjoying a video, film or audio such as a concert in a home theater experience by means of the apparatus 762. This is also particularly true for a gamer participating in a game using the apparatus 762. The multi-channel sound can captivate the listener's attention and create a more memorable experience. The user can be drawn more fully into the game or the video experience. Addition of surround sound can more powerfully enhance the experience even than increasing screen size of the display screen on which the game or video is viewed. Further, some media and games can be enjoyed as immersive experiences using virtual reality (VR), augmented reality (AR) or extended reality (XR) devices including video and audio presentation. The user may wear an immersive headset or goggles to see images surrounding the user. The immersive experience is further enhanced with surround sounds or multi-channel sound.

In some implementations of apparatus 762, the device is not capable of providing surround sound audio or a home theater experience. In an example, the apparatus 762 is implemented as a laptop computer, desktop computer or game console with only two relatively small speakers housed in the apparatus 762. The two speakers may provide stereo sound, with right and left channels. But the apparatus 762 alone lacks the ability to process and provide suitable signals for surround sound. This is true even if the application, such as a game or video application, produces encoded 5.1 surround sound or 7.1 surround sound.

Moreover, even if the apparatus 762 has the ability to provide multi-channel sound signals, the user may lack the equipment necessary to provide the full surround sound experience. Audio encoded as 5.1 surround sound generally requires six speakers for proper reproduction. Similarly, audio encoded as 7.1 surround sound require 8 speakers for proper reproduction. Further, the speakers conventionally included with an apparatus 762 such as a laptop computer are often of poor to fair quality. Such speakers are selected by the equipment manufacturer based on size and ability to fit in a very small computer or other device. Sound quality, including volume and frequency response are not the primary criteria for selection of such speakers in a laptop computer. For example, such speakers may provide poor audio reproduction for low frequency sound. However, those bass frequencies are an important aspect of the enhancement provided by surround sound. Some listeners may wish to enjoy the benefits of surround sound but do not have the hardware to do so.

However, may listeners have access to a conventional Bluetooth speaker. Such a speaker in many instances is portable and battery powered for convenient transportation. The speaker includes a Bluetooth transceiver for communication of audio signals with another device, such as a smartphone, tablet computer or laptop computer. If the apparatus 762 includes a similar Bluetooth transceiver, or other wireless transceiver circuit for communication with a remote device, the portable speaker may communicate with the apparatus 762. Even if no speaker with Bluetooth capability is available, many users have a supplemental speaker that can be plugged via a wireline connection to the apparatus 762.

Figure 7C:
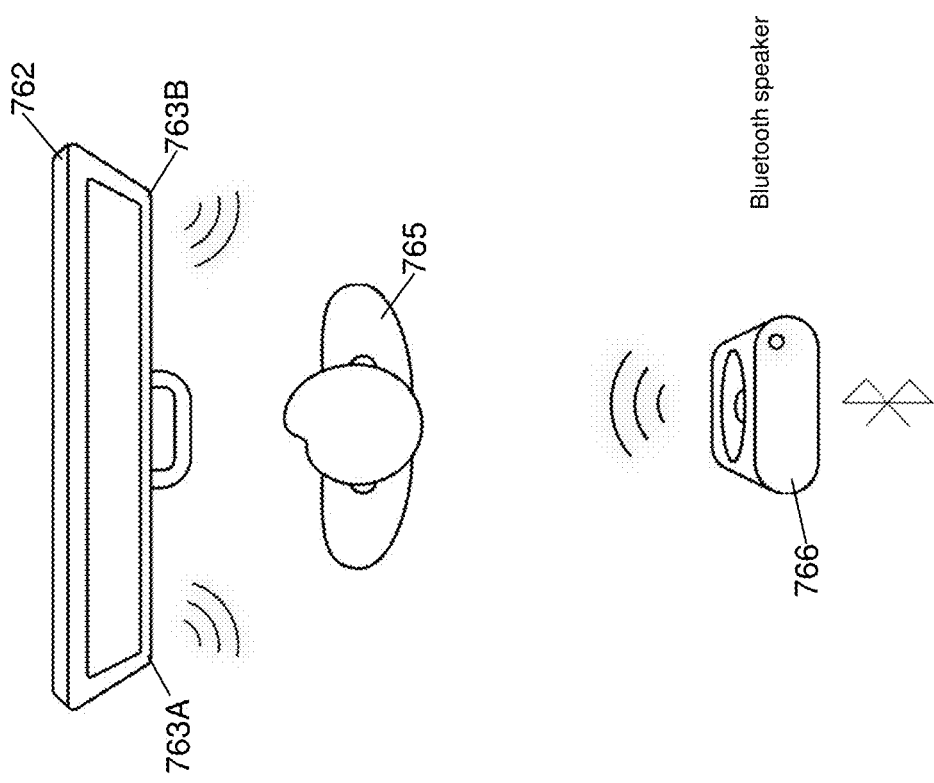
FIG. 7C depicts an illustrative embodiment of an apparatus in communication with a speaker to provide surround sound for a user.

Thus, FIG. 7C shows apparatus 762, embodied as a laptop computer or desktop computer, in communication with speaker 766 to provide surround sound for a user or listener 765. The apparatus 762 includes speakers 763A and 763B. The speakers 763A and 763B may be built-in to the housing of the apparatus 762. The speakers 763A and 763B may be of relatively small size in order for integration with the apparatus which, in embodiments may be portable such as laptop computer. The speakers 763A and 763B may further be of relatively low quality but of a quality sufficient to provide acceptable audio for various applications.

The apparatus is in data communication with the speaker 766. The connection between the laptop computer of apparatus 762 and the speaker 766 may be wireline using, for example, a three-conductor cable with right (R), left (L) and ground (G) conductors. Or the connection between the laptop computer of apparatus 762 and the speaker 766 may be a wireless connection between a wireless circuit of the laptop computer and a wireless circuit of the speaker 766. As shown in the example of FIG. 7C, the wireless connection between the laptop computer and the speaker 766 may be a Bluetooth connection. Further, the wireless connection may be a Wi-Fi connection.

In another embodiment, the apparatus 762 and the speaker 766 may communicate over a local area network (LAN) established by, for example, a wireless router (not shown). For example, many homes and offices use a wireless router to provide internet access via a modem connected to an internet connection. The wireless router manages communication between the modem and device one or more wireless networks. In an example, a wireless router may establish a first Wi-Fi network in a 2.4 GHz frequency band and a second Wi-Fi network in a 5 GHz band. Devices on the networks may communicate among themselves, including the laptop computer of apparatus 762 and the wireless speaker of speaker 766.

In accordance with various aspects described herein, a surround sound system may be constructed and operated. Embodiments enable a user or listener 765 who lacks a full surround sound setup, such as six or eight speakers for multi-channel surround sound, to enjoy the benefits of surround sound audio using, for example, apparatus 762 embodied as a laptop computer having speakers 763A and 763B to play back the front audio channels (L, R and C) to reconstruct a front audio scene along with a supplemental Bluetooth speaker 766 to playback the surround audio channels (Ls and Rs for 5.1 surround sound; or RL, RR, SL and SR for 7.1 surround sound) to reconstruct a surround audio scene. The apparatus 762 is situated in front of the user 7655 so that the speakers 763A and 763B provide a left front (LF) channel and a right front (RF) channel for audio for the user or listener 765. The speakers 763A and 763B form a primary set of speakers of the surround system. The speaker 766 is positioned behind the user or listener 765 to provide a rear audio channel for audio for the user or listener 765. The speaker 766, in conjunction with the primary set of speakers, speakers 763A and 763B, form part of the surround sound system. Embodiments use real speakers, for instance the speakers of the laptop computer to play back the front audio channels (L, R and C) to reconstruct a front audio scene, the Bluetooth speaker to playback the surround audio channels (Ls and Rs for 5.1; or RL, RR, SL and SR for 7.1) to reconstruct a surround audio scene. In typical use, the user or listener 765 faces a display of the apparatus 762 so that the ears of the user are positioned proximate and in the direction of the speakers 763A and 763B. Further, the user 765 has the speaker 766 positioned behind the head of the user or listener 765, approximately centered behind the user and at a suitable level for the user. A suitable level may be approximately level with the head of the user for hearing surround sound. In particular, the benefits of surround sound audio may be extended to users such as user or listener 765 of apparatus 762 such as a laptop computer by use of a speaker 766 such as a Bluetooth speaker.

Laptop computers generally are controlled by an operating system. Examples of such operations systems include Windows®, MacOS® and Chrome® and Linux®. Some operating systems have limitations in processing audio. In particular, multichannel audio processing is not supported by all operating systems. One example is the Windows operating system which is operable to receive 5.1 surround sound or 7.1 surround sound audio from an application such as a Windows media player, and to provide the 5.1 surround sound or 7.1 surround sound audio to a 5.1 or a 7.1 device, such as a surround sound speaker system. To experience 5.1 or 7.1 surround sound, the user of the laptop computer must have a compatible 5.1 or 7.1 surround sound audio system plugged into the laptop computer. An application such as Windows Media Player will send encoded multi-channel audio to the surround sound audio system. However, many if not all laptop computers are equipped only with two speakers for stereo audio reproduction. Stereo playback may be accommodated by inserting a stereo downmix function in the multi-channel signal path to produce stereo, right and left, channels. Multi-channel surround sound is not accommodated.

The Windows operating system is typically limited to processing a single audio stream at any given time. For example, an application such as Windows Media Player can generate a stream of audio data and that stream can be provided by the Windows operating system to one destination device. In the arrangement of FIG. 7B, in an example the apparatus 762 is a laptop computer operating under the Windows operating system. Audio data is generated by an application such as a video game. The Windows operating system permits the audio data to be provided only to either the built-in speakers of the laptop computer, the headphone 764 or the speaker 766.

One known solution includes an add-on adapter that introduces a virtual audio device which captures an input audio stream produced by an application and can open multiple identical, virtual audio streams fed by the same input audio stream. The device can duplicate an audio stream entirely and can route the duplicated audio stream to several devices simultaneously. Only the exact, duplicated audio stream can be separately routed to other devices.

Another known solution hooks the Windows Audio application programming interface (API) to duplicate the audio stream at the root of the stream. This solution opens the duplicate audio stream on the audio path of another device. Again, only the exact, duplicated audio stream can be separately routed to the other device.

Most laptop computer arrangements and users have generally several stereo devices, such as supplemental speakers and headphones, but no multi-channel devices. However, it is not conventionally possible to provide audio directly from a Windows operating system application to more than a single output audio device through the Windows operating system without add-on adapters. Further, the add-on adapters do not enable independent routing of different audio channels of the audio stream. For example, the known solutions which can only duplicate an entire audio stream do not enable routing the front channels of a 7.1 surround sound-encoded audio stream to one device and routing the surround channels to another device. The noted known solutions for the limitations of the Windows operating system cannot provide a surround sound or home theater experience. Other operating systems are similarly limited.

Figure 7D:
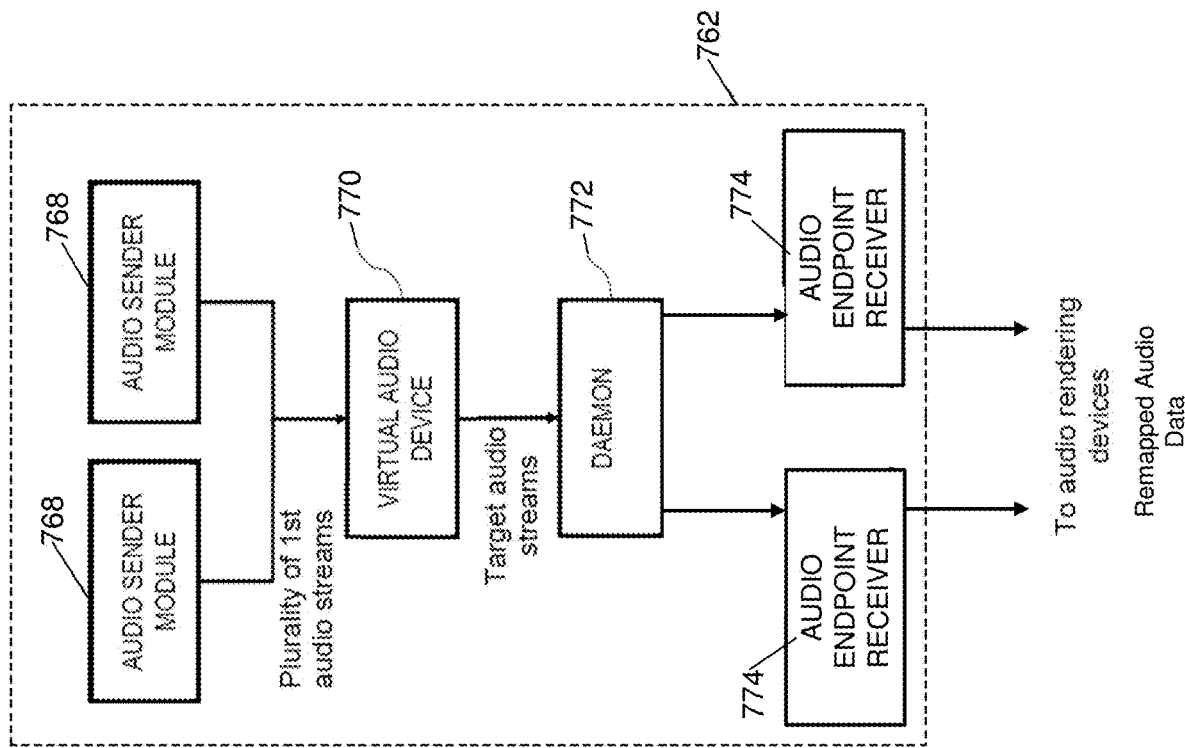
FIG. 7D depicts an illustrative embodiment of elements of the apparatus of FIG. 7B for providing audio data to multiple audio logical devices.

FIG. 7D depicts an illustrative embodiment of elements of the apparatus 762 for providing audio data to multiple audio logical devices such as the headphone 764 and the loudspeaker 766. In the example, apparatus 762 includes one or more audio sender modules 768 generating a plurality of audio streams, a virtual audio device 770, a daemon 772 producing a second plurality of audio streams and two or more audio endpoint receivers 774. Other embodiments of the apparatus 762 may include other or additional elements or components. The noted elements of the apparatus 762 may be implemented in hardware, software or any combination of these including a processing system including a processor and a memory storing data and instructions for the processor.

The elements of the apparatus 762 are configured to provide audio streams to the plurality of audio endpoints through which the audio logical devices receive the audio data. As illustrated on FIG. 7B, the apparatus 762 is typically embodied as a computer, such as a laptop computer, but the apparatus 762 can be any kind of processing device. The processing system of the apparatus 762 may be configured to perform various functions including the functions illustrated in the drawing figures. For example, the elements shown in the drawing as constituting the apparatus 762 can be implemented by the processing system including the memory of the apparatus 762. Connections between them are electrical connection or logical connections allowing them to communicate data, such as buses. The processing system of the apparatus 762 operates according to an operating system such as the Windows operating system. Other operating systems may be used as well. As noted, in some examples, the operating system does not allow audio streams to be provided from a single audio source or audio sender module to multiple destinations, such as audio endpoint receivers 774.

In illustrated exemplary embodiment, the apparatus 762 includes a plurality of audio sender modules 768, a virtual audio device 770, a daemon 772 and a plurality of audio endpoint receivers 774. The plurality of audio sender modules 768 provide a plurality of first audio streams. An audio sender module 768 can include any source of audio streams inside the apparatus 762 and can be for example a video game application or an application providing playback of a video file such as a Windows Media Player. In the example of FIG. 7D, two audio sender modules 768 are shown. However, in other examples, fewer or more audio sender modules 768 may be implemented by the processing system of the apparatus 762.

The plurality of first audio streams produced by the audio sender modules 768 each comprise audio data. The audio data may comprise audio from an application or media, such as music, film, and video games. The audio data are provided by the audio sender modules 768 in the form of multi-channel signals forming the plurality of first audio streams. Examples of multi-channel signals include audio encoded for 5.1 surround sound or 7.1 surround sound. This is convenient for many applications. Such an arrangement allows direct rendering of the audio sound corresponding to the provided audio data using conventional channel-based rendering system, such as 5.1 surround sound or 7.1 surround sound systems. The first audio streams provided by the plurality of audio sender modules 768 are sent to a virtual audio device 770 to which the audio sender modules 768 are connected.

The virtual audio device 770 may form an audio logical device. The virtual audio device 770 may be a device used for example for recording the received audio data or for sending the received audio data on a network. In contrast to a virtual audio device, a real audio device is a physical device such as a laptop computer audio system or a Bluetooth speaker. On a computer such as a laptop computer forming the apparatus 762, an operating system will expose a digital device. The operating system will see the digital device as an addressable endpoint. There is no real, physical system behind the addressable endpoint, including no hardware and no firmware. The virtual audio device 770 is just a device in the sense of the operating system. The virtual audio device 770 may present itself to the operating system of the apparatus 762 as a sound card or other physical device. It may just be an address to which audio data is written by the processing system under control of the operating system. The audio data may be subsequently read and processed by other devices. However, the virtual audio device 770 is a virtual device because there is no physical device associated with it.

In an embodiment, the virtual audio device 770 may be configured as a portion of code stored in memory for performing suitable functions such as controlling a processing system. The virtual audio device 770 may receive the first plurality of audio streams from the plurality of audio sender modules 768 and combine them to form a target audio stream. The virtual audio device 770 is configured to route the target audio stream to the daemon 772.

In an embodiment, the virtual audio device 770 includes a source code that embeds a functionality capable of routing the target audio stream to the daemon 772. In practice, the virtual audio device 770 re-emits the audio data received on its audio receiver endpoint in the form of the plurality of first audio streams on an audio emitter endpoint that will be read by the daemon 772. The daemon 772 is therefore connected to an audio emitter endpoint of the virtual audio device 770. In some embodiments in conjunction with the Windows operating system the audio endpoint receiver of the virtual audio device 770 typically corresponds to the so-called Windows operating system audio endpoint sink, and the audio endpoint emitter of the virtual audio device 770 typically corresponds to the so-called Windows operating system audio endpoint source.

The daemon 772 is configured to provide audio output streams to a plurality of audio device, including audio endpoint receivers 774. Each audio output stream from the daemon 772 may be identical or may be uniquely constructed or configured for a particular audio device. For example, the daemon may configure a 5.7 surround sound or 7.1 surround sound encoded channel to a first audio endpoint receiver and configure a low frequency effects (LFE) channel or a surround sound channel to a second audio endpoint receiver. In a second example, the daemon 772 may provide low pass filtering to a first audio endpoint receiver 774 and no filtering, only gain, to a second audio endpoint receiver 774.

The daemon 772 may include instructions and data forming an application running on the processing system in the background, as opposed to a function accessible by a user interface that can be displayed and seen by the user. The daemon 772 may include instructions and data that configured to perform audio processing on the target audio streams received from the virtual audio device 770. For example, the daemon 772 may form a mixer and perform suitable mixing functions on the audio stream. Exemplary mixing functions include selecting among various input sources, adjusting volume levels and other attributes of the audio signal, filtering, compensation and combining audio streams and providing one or more output streams at one or more outputs. The mixing functions performed by the daemon 772 may further include manipulating audio channels, such as the individual channels of a multichannel audio signal such as 5.1 surround sound or 7.1 surround sound. The channels of the multichannel audio signal may be combined, separated and modified in any suitable manner to produce a desired output signal. Examples of mixing functions performed by the daemon 772 include duplicating an input audio stream to provide a duplicate output audio stream, transmitting only a left (L) channel of an audio stream to a first output destination and only a right (R) channel of the audio stream to a second output destination. In some embodiments, the daemon 772 is configured to remap the channels of the target audio stream received from the virtual audio device 770 to the plurality of audio endpoint receivers 774. A more detailed description of an exemplary embodiment of the daemon 772 is given hereafter in relation with FIG. 7E.

The plurality of audio endpoint receivers 774 may receive the remapped audio data from the daemon 772 in the form of a plurality of second audio streams and may render the remapped audio data on multiple audio logical devices or audio rendering devices. The audio logical devices can be audio rendering devices such as speaker 766 including wireless speakers such as Bluetooth stereo speakers, one or multiple smartphones in wireless communication with the apparatus 762, headphone 764 and other devices as well.

Figure 7E:
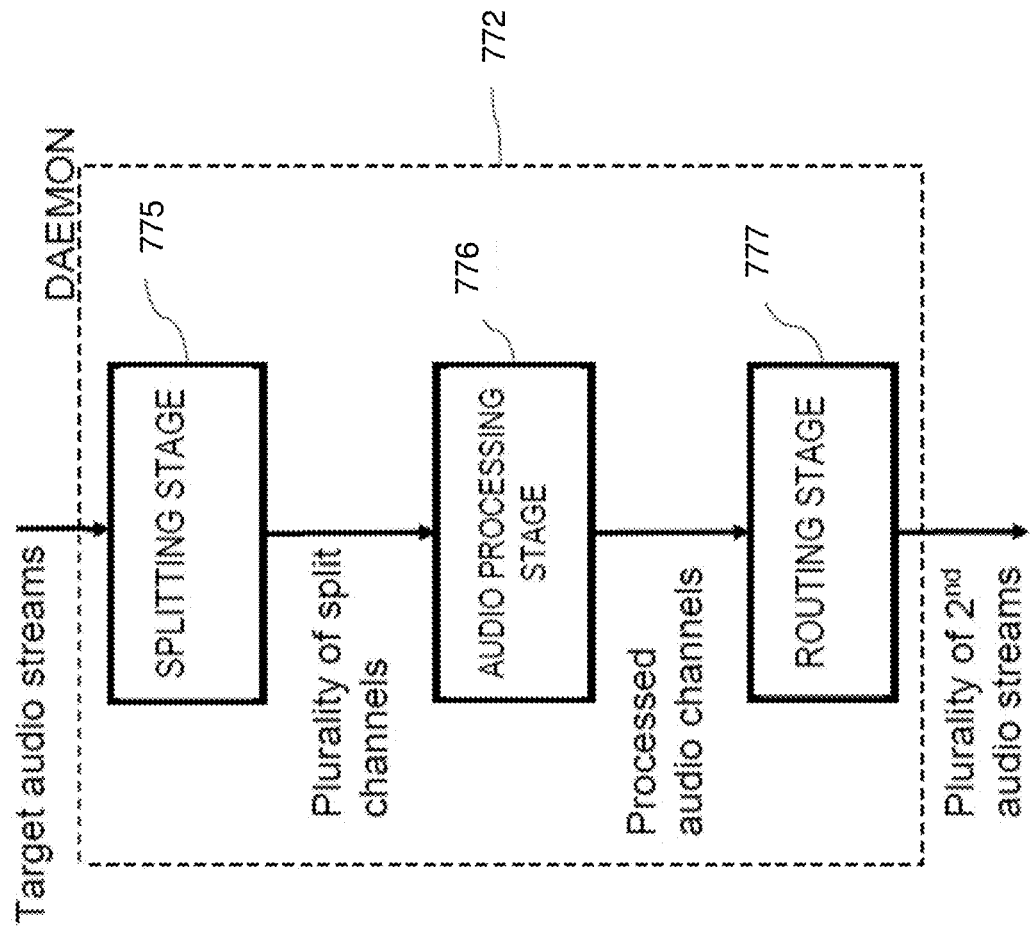
FIG. 7E illustrates an illustrative embodiment of a daemon for remapping audio channels in the apparatus of FIG. 7B.

FIG. 7E illustrates an exemplary embodiment of elements of the daemon 772 for remapping the channels of the target audio stream. The daemon 772 in the illustrated embodiment comprises a splitting stage 775, an audio processing stage 776, and a routing stage 777. Other embodiments may include additional or alternative components. The splitting stage 775, the audio processing stage 776, and the routing stage 777 in some embodiments are implemented as instructions and data stored in memory for execution by a processing system.

The splitting stage 775 may split the target audio stream into split audio channels based on the audio channels of the target audio stream. The splitting stage 775 is connected to the virtual audio device 770 (FIG. 7D) and is configured to receive the target audio stream from the virtual audio device 770. The splitting stage 775 is connected to the audio processing stage 776 and is configured to send the split audio channels derived from the target audio stream to the audio processing stage 776. In some embodiments, the splitting stage 775 duplicates the received target audio stream and provides a plurality of split audio streams to the audio processing stage. Any suitable technique may be used for duplicating the audio stream.

The audio processing stage 776 may receive the split audio channels from the splitting stage 775 and is configured to process the split audio channels at a signal level to produce processed audio channels. The processing of a signal of a split audio channel depends on a signal of at least one other split audio channel. The audio processing stage 776 operates to perform mixing of the audio streams. For a multichannel audio stream, the audio processing stage 776 may select which channels to keep and which channels to remove or combine into a single channel. The audio processing stage 776 may apply gain to one or more channels of a multichannel audio stream.

In a particular embodiment, the audio processing stage 776 will receive from the audio splitting stage 775 as a first input audio stream a complete multichannel audio stream, such as 5.1 surround sound stream or a 7.1 surround sound stream. The audio processing stage 776 will keep the front right, the front left and the center channel from the multichannel audio stream and delete or discard the surround sound and the subwoofer channels. Also, the audio processing stage 776 will combine the front left, the center and the front right channels together to produce a front stereo stream that may be routed to the built-in left speaker 763A and right speaker 763B on a laptop computer embodying the apparatus 762 (FIG. 7C). Further, the audio processing stage 776 will receive a second, identical input audio stream from the splitting stage 775. In the second input audio stream, the audio processing stage will discard the front right, center and front left channels but maintain the surround sound and subwoofer channels. In addition, the audio processing stage may combine the surround sound and subwoofer channels together to produce a surround channel which may be provided to a supplemental speaker such as Bluetooth speaker 766 (FIG. 7C).

Further, the audio processing stage 776 may operate to reverse the right channel and the left channel provided to the surround channel. While in the exemplary embodiment of FIG. 7C, a single supplemental speaker 766 is provided. However, many supplemental speakers and many Bluetooth-compatible speakers include stereo capability. For example, the supplemental speaker 766 includes a housing containing two separate speaker systems, audio processing circuitry, radio circuitry and control circuitry. The control circuitry controls overall operation of the supplemental speaker. The radio circuitry provides radio communication compatibility according to, for example, the Bluetooth specification or an 801.11 Wi-Fi specification. The radio circuitry may receive from a remote device such as a radio circuit of the laptop computer encoded audio data. The radio circuitry may provide information to the remote device as well. For example, the radio circuitry may provide encoded audio received from a microphone and encoder circuit of the supplemental speaker. Also, the radio circuitry may provide information about the manufacturer, model and technical capabilities of the supplemental speaker 766. The audio processing circuitry of the supplemental speaker 766 may decode the encoded audio and generate suitable signals to drive the speakers of the supplemental speaker 766. The signals may be right and left channel stereo signals.

For a listener 765 positioned at a listening position as in FIG. 7C, the right channel and the left channel of a stereo signal heard from the supplemental speaker 766 must be reversed relative to the right channel and left channel of the built-in speakers 763A, 763B. Positioning the supplemental speaker 766 behind the listener 765 causes the apparent positions of the right channel and the left channel to revers. Therefore, in order to improve the simulated surround sound effect provided by the supplemental speaker 766 in conjunction with the left front speaker 763A and the right front speaker 763B, the audio processing stage 776 reverses the right channel and the left channel provided to the supplemental speaker 766 through the routing stage 777. In this manner, sounds that appear to originate on the right side of the listener 765 are played on the right channel of the right front speaker 763B and on the left stereo channel of the supplemental speaker 766. Similarly, sounds that appear to originate on the left side of the listener 765 are played on the left channel of the left front speaker 763A and on the right stereo channel of the supplemental speaker 766. Thus, proper spatial orientation is maintained for the listener 765.

In some embodiments, an audio stream may originate as a multichannel surround sound audio stream but an application, such as a media player, or some component of the operating system, may only provide a stereo stream with a right channel and a left channel. Thus, the splitting stage 775 of the daemon 772 receives the right channel and the left channel and may duplicate those channels. The audio processing stage 776 may select relatively low frequencies corresponding to bass portions of the audio to form a bass channel. The audio processing stage 776 may provide the bass channel to the routing stage 777 and also provide the right channel and the left channel of the stereo stream to the routing stage 777. The routing stage 777 will route the left channel of the stereo stream to the left speaker 763A and rout the right channel of the stereo stream to the right speaker 763B of the laptop computer embodying the apparatus 762. The routing stage 777 will route the bass channel to the supplemental speaker 766. Typically, a stand-alone supplemental speaker, including a Bluetooth speaker, will have a better bass response than built-in speakers of a laptop computer. The bass channel thus forms a surround channel by providing the relatively lower frequencies to the rear, supplemental speaker. Any suitable frequency range may be selected for the bass channel, such as frequencies from 40 Hz to 400 Hz. The audio processing stage 776 may implement a suitable low pass filter to separate the relatively low frequencies of the bass channel from the remainder of the frequencies of the spectrum of the input stereo channel. In some regards, the daemon thus may create a subwoofer channel, forming a 2.1 surround sound system with right, left and subwoofer channels. Also, as discussed above, the right channel and the left channel may be reversed by the audio processing stage 776 when forming the bass channel for playback behind the listener 765 to maintain proper spatial orientation and information.

In some embodiments, the audio processing stage 776 can operate to synchronize audio of the front channel and audio of the surround channel. The audio of the two channels may originate from the same multichannel audio stream or may originate from duplicates of an original multichannel audio stream. However, because of audio processing variations and other reasons, the audio may exhibit a time delay mismatch and be unsynchronized or appear to a listener to be unsynchronized. If the lack of synchrony is large enough, it can be distracting or annoying to the listener. Accordingly, some embodiments synchronize audio of the front channel and audio of the surround channel. The synchronization of the front channel and the surround channel may be defined as a mismatch in timing of audio between the two channels that is less than a threshold amount, such as 5 ms or 100 ms.

In a particular example, embodiments can have a time latency adjustment mechanism controlling delays between split audio channels. In some examples, a time latency mismatch can occur between audio provided to, for example, built-in speakers of a laptop computer and a Bluetooth speaker system in data communication with and producing audio from the laptop computer. For example, in a wireline connection, time latency may be on the order of 5-10 ms, representing a delay from generation of the sounds signal in circuitry of the audio driver which drives the speakers. In a Bluetooth wireless connection, the latency may be 34 ms up to 100 or 300 ms, depending on many factors affecting the transmission of data over the wireless connection such as noise on the radio channel, amount of data that must be transmitted, the Bluetooth codec that is used, etc. For example, a noisy channel may require the data to be transmitted repeatedly for reliable reception. If very high quality audio encoding is used, the bit rate may be relatively large and require a longer transmission time. Multiple different codecs are used for compressing, encoding and decoding audio files, and the different codecs may introduce more or less delay in transmission and reception of data at the Bluetooth speaker. Longer transmission times, or delays in reception, correspond to increased latency. As indicated, the wireless latency may be much greater than the wireline latency. Moreover, the wireless latency may be variable due to changing conditions, such as a change in the noise environment or a change in the amount of data being communicated to the Bluetooth speaker. The time latency adjustment mechanism detects and corrects for such a time latency mismatch. The choice of Bluetooth profile can be done in accordance with the type of played audio media. For example, music and movies that do not require low latency can be transmitted through the Advanced Audio Distribution Profile (A2DP) while audio of a video game that require lower latency may be transmitted through Hands-Free Profile (HFP) with a certain loss of audio quality. In addition, in some examples, the type of audio media can be detected automatically by audio analysis.

In an example, the audio processing stage 776 detects a particular sound in the audio stream and uses the particular sound to implement a time adjustment to eliminate the time latency mismatch. For example, a video being played may include a gunshot sound. The gunshot sound has a temporal profile that allows it to serve as a time marker for adjusting a delay, such as a delay in an audio stream played to the built-in speakers of a laptop computer. Adding the delay to the front channel provided by the laptop computer speakers compensates for inherent latency of the Bluetooth connection.

The daemon 772 may include a latency adjustment mechanism to automatically compensate for latency mismatch between the front channel provided to the laptop speakers and the surround channel provided to the Bluetooth or other supplemental speaker. In an embodiment, the latency adjustment mechanism automatically measures a first delay in the sound reproduction of the Bluetooth speaker and a second delay in the sound reproduction of the built-in laptop speakers. These delays may be measured in any suitable manner, such as by collecting audio with a microphone to determining a time when a sound, such as a gunshot, is produced by each speaker. For example, a test sound may be played first to the front channel and then to the surround channel and a respective delay in sound reproduction by each respective speaker may be measured. In another embodiment, in place of a test sound, a segment of content audio from an application such as a media player or a video game may be played to the front channel and the surround channel, and the respective delays measured. In another example, information about an environment where the devices are located may be used to determine delays and latency. For example, the microphone detecting the sound transmissions may be physically close to the built-in speaker, such as 40 cm. On the other hand, the microphone might be 2-m from the Bluetooth speaker. The delay difference due to this positioning might be on the order of 2-3 ms. The latency adjustment mechanism may take this delay difference into account when adjusting for the delay. Similarly, the latency adjustment mechanism may use any available a priori information about the environment when making adjustments or introducing delay. Based on information available, the latency adjustment mechanism then introduces a delay to reduce the difference between the second delay and the first delay. Because the delays may vary with time, e.g., due to changes in the Bluetooth delay, the latency adjustment mechanism may continuously monitor the latency mismatch and correct the mismatch in an ongoing process. If the latency adjustment mechanism determines that the latency mismatch exceeds a predetermined threshold, such as a 5 ms difference between delay to the surround channel and delay to the front channel, then the amount of delay introduced by the latency adjustment mechanism may be adjusted to reduce the respective delays. Any suitable threshold may be used, and the predetermined threshold may be adapted based on, for example, the nature of the multi-channel audio stream. For example, latency mismatch for sound effects of a video game may not be as detectable or annoying to a listener as a latency mismatch in spoken words or music of a video. Alternatively, the process could be done periodically, or only at the beginning of an audio playback operation.

In another embodiment, latency adjustment may be accomplished manually with cooperation of the listener. In an embodiment, a latency adjustment procedure is introduced. A user interface is displayed on a display of the laptop computer. The user interface may be embodied in any suitable fashion such as a graphical device such as a slider or knob which the user can engage with a mouse or through a touch-sensitive screen. In the latency adjustment procedure, a sound is played to the user through the multiple speakers. The same sound or a different sound may be played to the front speakers built-in to the laptop computer and to the Bluetooth or other supplemental speaker. The listener is given the opportunity to adjust the graphical slider to reduce or minimize the temporal delay between the primary speakers and the supplemental speaker, and between the front channel and the surround channel. The latency adjustment procedure may be performed initially, when the listener begins engagement with a video game, media or other source. In other examples, the latency adjustment procedure may be performed occasionally or periodically, or at the initiation of the listener. If the listener detects an audible time mismatch, the user may suspend audio playback and initiate the latency adjustment procedure.

In a further embodiment, a latency adjustment operation may include both automatic and manual phases. For example, initially a manual procedure may be performed during which the listener manually adjusts the delay of a test sound or set of test sounds. The listener adjusts the delay using a user interface until the relative delays to the front channel speakers and the rear channel speakers are nearly equalized, to the point where the listener is comfortable with the relative delays. This establishes a manual setpoint for speaker latency. The latency adjustment mechanism may subsequently use the manual setpoint for automatic adjustments. For example, once the manual setpoint is established, the latency adjustment mechanism may begin monitoring the delays to both the front speakers and the supplemental speaker. If the delays vary from the manual setpoint, the latency adjustment mechanism may adjust delays to either the front speaker or the surround speaker to compensate for and eliminate any latency mismatch.

In some embodiments, the audio processing stage 776 may implement binaural processing or transaural processing. Such processing may create a virtual auditory scene or virtual auditory environment for the listener. Such processing may work with two-channel audio reproduction systems such as headphones and stereo loudspeaker systems. For binaural recording, two microphones are placed in ear canals of a human or artificial head and output is recorded using a conventional stereo recorder. When a listener listens through headphones, the effect created causes the listener to hear sound reproduction as if the listener was present in the original sound field. Loudspeakers, such as the speakers of a laptop computer, may be used in place of headphones, with the requirement that the binaural signals are suitably processed for playback through loudspeakers. For example, a listener hearing two stereo speakers hears sound from each speaker in each ear. However, the acoustic reproduction requires that the left ear hear sound only from the left speaker and the right ear hear sound only from the right speaker. Accordingly, cross-talk cancellation is employed to limit the sound heard from the left speaker by the right ear and the sound heard from the right speaker by the left ear. A system that implements cross-talk cancellation in this fashion is referred to as a transaural system. Listening over stereo loudspeakers makes the sound seem to originate from between the two stereo speakers in front of the listener. Transaural audio appears to extend the sound field beyond the separation of the loudspeakers and the sound appears to surround the listener. In some embodiments, the audio processing stage 776 implements or simulates binaural processing or transaural processing or similar audio processing to provide a virtual surround system. Transaural® is a trademark of Cooper Bauck Corporation. The virtual surround system may include a supplemental speaker such as the Bluetooth speaker or may omit the supplemental speaker.

The audio processing stage 776 may be configured to perform audio analysis and synthesis. The audio analysis may include determining whether the audio data contained in the split audio channels corresponds to voice or music, or any other kind of sound. The synthesis can include creating new channels or modifying channels, for example, based on the result of the audio analysis. The audio processing stage 776 may include filtering or source separation. The audio processing stage 776 is connected to the audio stream routing stage 777 and is configured to send the processed audio channels to the audio stream routing stage 777.

The routing stage 777 is configured to receive the processed audio channels from the audio processing stage 776 and to route the processed audio channels to a plurality of audio endpoint receivers 774 in the form of a plurality of second audio streams. The routing stage 777 can be configured to duplicate or merge the channels, for example for upmixing or downmixing. The second audio streams sent to the plurality of audio endpoint receivers 774 can be multichannel as well. The second audio streams can be multichannel, that they can be at any format compatible with the operating system (generally stereo, 5.1 surround sound, 7.1 surround sound as well as 4.0 surround sound).

In some embodiments, the daemon 772 will open new audio streams in the operating system of the apparatus 762. Any application operating on, for example, the Windows operating system can open a new audio stream. The routing stage 777 receives two audio streams from the audio processing stage 776, including a front stereo stream and a surround stream. Each audio stream can be composed of multiple audio channels. The routing stage 777 routes the front stereo stream to the newly opened operating system audio stream corresponding to the built-in speakers 763A, 763B of the laptop computer embodying the apparatus 762. Further, the routing stage 777 routes the surround stream to the newly opened operating system audio stream corresponding to the supplemental speaker, such as Bluetooth speaker 766.

The daemon 772 is configured in some embodiments to remap audio channels from a first audio format to a second audio format. The daemon 772 receives audio encoded in an original multi-channel, audio input format. The audio input format may be any suitable encoding format including, for example, stereo, 5.1 surround sound or 7.1 surround sound. The daemon 772 responds to the received audio by remapping the received audio to an output audio format. The output audio format may be suitable for a specific, heterogeneous multi-speaker surround system configuration.

In a first example of remapping, a plurality of first audio streams in accordance with a 5.1 surround sound audio configuration is received. The first audio streams comprise three front channels including front left channel, front right channel, and center channel, two surround channels designated surround left channel and surround right channel, and a subwoofer channel designated low-frequency effects channel. The front channels can be routed to two laptop speakers built into the apparatus 762, such as speakers on the front or sides of a laptop computer. The center channel in this example is distributed between left and right built-in speakers. The three other channels can be merged and routed to a supplemental speaker such as speaker 766 in FIG. 7C. The supplemental speaker may be, for example, connected by a Bluetooth wireless connection to the apparatus 762.

In a second example of remapping, two first audio streams in stereo are received as input audio streams by the daemon 772. The daemon 772 remaps the two first audio streams to a 2.1 audio configuration including two front channels played by two speakers, such as the speakers built into the apparatus 762, and a subwoofer channel or low-frequency effects (LFE) channel played by another speaker. The subwoofer channel may be created by the daemon 772 from the application of a low pass filter by the daemon on the two first audio streams. The subwoofer channel, in some embodiments, may be provided to a supplemental speaker such as a Bluetooth speaker in data communication with the apparatus 762.

In another example, a LFE channel may produced by the daemon from any suitable multichannel input audio stream. The daemon 772 may, for example, filter, in a lowpass filter, all channels of the multichannel audio stream to produce a plurality of filtered audio channels. The daemon 772 may further combine the filtered audio channels to form a created low-frequency effects (LFE) channel. If the multichannel audio stream includes an existing LFE channel, such as if the input multichannel audio stream is a 5.1 surround sound audio stream or a 7.1 surround sound audio stream, the daemon 772 may combine the created LFE channel and the existing LFE channel to form an LFE channel. The LFE channel is then routed to the Bluetooth or other supplemental speaker.

In a third example of remapping, an audio channel having an object-based format such as MPEG-H or Dolby Atmos encoded audio may be remapped to any audio format, including stereo, 5.1 surround sound, 7.1 surround sound and binaural or transaural audio. This mapping may be done, for example, if the Bluetooth speaker has at least two speakers. Dolby Atmos is a trademark of Dolby Laboratories Licensing Corporation.

FIG. 7F illustrates an example of elements of the apparatus 762 which is configured to provide audio data to the plurality of audio endpoint receivers 774. As in the embodiment of FIG. 7B, the apparatus 762 comprises a plurality of audio sender modules 768 providing the audio data in the form of a plurality of first audio streams.

Typically, the virtual audio device 770 may receive the plurality of first audio streams coming from the plurality of audio sender modules 768. The first audio streams may be intercepted by a so-called loopback performed by the daemon 772 before the first audio streams arrive at the virtual audio device 770. To this end, the connection between the virtual audio device 770 and the daemon 772 may be operated by the daemon 772 in the form of a loopback before the virtual audio device 770. In one example involving the Windows operating system, the daemon 772 uses an Application Programming Interface (API) of the operating system of the apparatus 762 such as the Windows Audio Session API (WASAPI) to create an object such as an IAudioCaptureClient object to capture the audio buffer routed to the audio sink endpoint of the virtual audio device 770. In other examples, and using other operating systems, the daemon may use alternative suitable means.

As before, the daemon 772 is configured to remap the target audio stream channels to the plurality of audio endpoint receivers 774. As before, the plurality of audio endpoint receivers 774 may receive the remapped audio data from the daemon 772 in the form of a plurality of second audio streams and may render the remapped audio data on multiple audio rendering devices. Any suitable number of audio endpoint receivers 774 may be provided. Each respective audio endpoint receiver 774 of the plurality of audio endpoint receivers may receive from the daemon 772 a respective audio stream. Each respective audio stream may have any suitable format or encoding of audio information. In one particular embodiment, a first audio endpoint receiver 774 includes left (L) and right (R) channel stereo speakers 781 of a laptop computer and a second audio endpoint receiver 774 includes a Bluetooth speaker 783 in data communication with the laptop computer.

In an embodiment, a speaker or other audio device communicating with the system, such as the Bluetooth speaker 783, has particular audio characteristics. This may be true for other types of speakers as well, such as a speaker connected by a Universal Serial Bus (USB) or other connection. Audio characteristics may include a typical frequency response for the Bluetooth speaker 783, including frequencies where gain is suppressed or enhanced due to the construction of the speaker. Audio characteristics may include information about relative volume gain of the Bluetooth speaker 783, indicating that a particular model of speaker plays more softly than other models and requires an increased volume or gain relative to other models. The audio characteristics of the Bluetooth speaker 783 may be related to the manufacturer or the model number of the speaker. In accordance with some embodiments, the Bluetooth speaker 783 reports to the laptop computer or other apparatus information about the Bluetooth speaker 783. Such information may include manufacturer identity information and model information for the Bluetooth speaker 783. The Bluetooth speaker 783 may also report particular technical information about its audio characteristics.

In an embodiment, the laptop computer or other apparatus implements a procedure in which the laptop computer receives the information about a digitally connected speaker such as the Bluetooth speaker 783 and uses the information to adapt the audio stream provided to the Bluetooth speaker 783. Any digital speaker, when connected to the laptop computer, the digital speaker appears to the operating system of the laptop computer as a dedicated sound card device and enables receipt of information from the digital computer by the operating system of the laptop computer. Adapting the audio stream provided to the Bluetooth speaker may include, for example, determining the frequency response of the Bluetooth speaker and adjusting spectral components such as a selected range of frequencies of the audio stream according to the frequency response of the Bluetooth speaker. This may be done to compensate for limitations in the frequency response of the Bluetooth speaker, such as poor high-frequency reproduction by the Bluetooth speaker. In other embodiments, this may be done to take advantage of aspects of the frequency response of the Bluetooth speaker.

For example, if the procedure determines that the brand and model of the Bluetooth speaker 783 is of relatively high quality with good bass response, the procedure adjusts the amount of bass being sent to the Bluetooth speaker 783. Adjusting the amount of bass may include applying a low-frequency filter to select relatively low frequencies of the surround channel, applying gain or amplification to the selected frequencies, and recombining the amplified frequencies with other frequency components of the surround channel. In an embodiment, the audio processing stage 776 of the daemon 72 (FIG. 7E) adjusts the gain provided to a relatively low-frequency bandwidth of frequencies provided on the surround channel through the routing stage 777 to the Bluetooth speaker 783. Since many Bluetooth speakers have relatively good bass performance, this may enhance the surround sound effect created by using the Bluetooth speaker in a virtual surround sound arrangement. On the other hand, if the procedure determines that the Bluetooth speaker 783 has a relatively poor bass response, the procedure controls the audio processing stage 776 of the daemon 772 to compress the bass frequencies more to thereby limit the bass frequencies and not saturate the Bluetooth speaker 783. The process in some embodiments is fully automatic based on the reported information about the Bluetooth speaker 783.

In another example, the procedure includes receiving information about the Bluetooth speaker 783 and retrieving stored information about the Bluetooth speaker, based on the received information. For example, the procedure receives from the Bluetooth speaker a brand name and model number of the speaker. The procedure accesses a lookup table which stores information about the speaker according to brand name and model number. The procedure retrieves from the lookup table relevant compensation information and uses the compensation information to adapt audio processing to compensate for the audio characteristics of the speaker. The compensation information may relate to frequency response of the speaker or any suitable performance criteria which can be corrected or improved or otherwise compensated. In an alternative embodiment, the laptop computer or other apparatus has access to a network connection such as to the internet. The procedure may include a step of communicating, over the network to a remote location, the information about the speaker, including for example the brand and model number. In response to the communicated information, a network location such as a website returns relevant compensation information which may be used to adjust audio processing to compensate for characteristics of the speaker. This procedure of accessing information over a network allows access to the most up-to-date compensation information including for speakers that are newly released products.

In another embodiment, a plurality of equalization curves may be accessed or stored and retrieved for the particular audio output devices. Equalization curves specify relative gain or filtering applied to different frequencies across an audio spectrum. Equalization may be applied, for example by audio processing circuitry or software routines of the daemon 772. Different equalization curves may be specified for different purposes. For example, a particular equalization curve may be applied to compensate for limitations of a particular speaker, such as to add bass or reduce treble frequencies. Another particular equalization curve may be applied to accommodate a particular environment. Other particular equalization curves may be applied to accommodate particular user preferences, or particular applications such as a video game where more rumbling bass is desirable. The equalization curves may be stored in a database of the device or may be retrieved from elsewhere, such as from a database accessible over the network. The equalization curves may be selected automatically or may be user-selectable, such as through a user interface.

Embodiments may include a user interface for actuation by a listener to fine tune audio according to preferences of the listener. The user interface may be created on a display of the laptop computer and may include graphical elements such as sliders and knobs to allow the listener to adjust various aspects of the audio. In one example, relative volume of the front channel speakers and the surround channel speaker may be adjusted. In another example, the crossover frequency for bass may be adjustable manually by the user. In another example, the listener may prefer that the left and right channels not be inverted between the front channel and the surround channel, so the channel inversion may be controlled by the listener through the user interface. In another example, the listener may select a head-related transfer function (HRTF) to be applied by the audio processing stage of the daemon. If the audio source has in place surround sound, such as 5.1 surround sound or 7.1 surrounds sound, the user interface may enable the listener to disable or enable the immersive audio from the surround sound encoding. Thus, the listener has the option to choose to have both only the immersive effect provided by the Bluetooth speaker, only the simulated surround sound provided by the Bluetooth speaker, or a combination of the two effects. Any suitable setting may be selected and adjusted by the listener according to listener preferences.

FIG. 7G depicts an illustrative embodiment of a fourth method 795 utilized in the subject disclosure. The method 795 may be used in conjunction with any suitable apparatus, such as a laptop computer, to generate surround sound for a user of the apparatus. The apparatus may be combined with a supplemental speaker, such as a Bluetooth speaker, to produce the surround sound effect. The supplemental speaker adds virtualization processing to enhance the immersion that might be limited with, for instance, a unique additional Bluetooth placed behind the listener.

At block 784, the Bluetooth speaker is identified, and characteristics of the speaker are retrieved. In an embodiment, the Bluetooth speaker is in data communication with a laptop computer for playing audio streams originating in or produced by the laptop computer. Communication between the laptop computer and the Bluetooth speaker may begin when a radio link is established between the laptop computer and the Bluetooth speaker. This may be accomplished in any suitable manner according to the Bluetooth standard protocol. When communicating with the laptop computer, the Bluetooth speaker provides identifying information. The identifying information for the Bluetooth speaker may include a manufacturer name, a brand name, a model number or part number, or any other suitable information. The laptop computer receives the identifying information over the radio link and uses the identifying information to obtain speaker characteristic information for the speaker. The speaker characteristic information may specify any suitable information about the capabilities, limitations, and features of the Bluetooth speaker. The laptop computer may use the speaker characteristic information when processing audio information for playback on the Bluetooth speaker.

At block 785, the laptop computer receives one or more multichannel audio streams. Examples include a 5.1 surround sound audio stream, a 7.1 surround sound audio stream and a 2.1 stereo audio stream. The received audio stream may originate with an application running on the laptop computer, such as a video game, a media file, or a content item such as a video, film, or audio file. In some embodiments, the multichannel audio stream is encoded to provide a surround sound effect in which audio has a spatial effect or orientation and may seem to move around the listener. At block 786, the received audio stream is duplicated by the laptop computer. This may be done in any suitable manner, such as by copying audio data from a first file to a second file. Block 786 produces a first duplicate audio stream and a second duplicate audio stream.

At block 787, the laptop computer operates on a first duplicate audio stream to generate a front channel for a surround sound arrangement. The laptop computer combines channels of the multichannel audio stream to form the front channel. In the example of 5.1 surround sound or 7.1 surround sound, the laptop computer retains the right (R), center (C) and left (L) channels and discards the surround sound channels and the subwoofer channel. The right, center and left channels are combined to form the front channel for the surround sound arrangement.

At block 788, the laptop computer further processes the audio stream forming the front channel. The laptop computer may receive listener input from a user interface (U/I) including, for example, volume adjustments, selection of a bass crossover frequency and other user-selectable features.

At block 789, the front channel is provided to suitable speakers. In an exemplary embodiment the audio stream of the front channel is provided to built-in speakers of the laptop computer. The laptop computer is positioned generally in front of the listener with the listener viewing the display screen of the laptop computer and hearing the audio from the speakers of the laptop computer. The right speaker of the laptop computer is proximate the right ear of the listener. The left speaker of the laptop computer is proximate the left ear of the listener. The listener is positioned a suitable distance from the display screen and speakers of the laptop computer.

At block 790, the surround channel of the surround sound arrangement is generated by the laptop computer. In the example, where the audio stream is a 5.1 surround sound stream or a 7.1 surround sound stream, at block 790 the laptop computer discards the data forming the front right (R), front center (C) and front left (L) channels and retains the surround sound channels and the subwoofer channel. The surround sound channels and the subwoofer channel are then combined to form the surround channel. The surround channel is to be played at the Bluetooth speaker located behind the listener.

At block 791, the laptop computer further processes the audio stream forming the surround channel. Such processing may include inversion of the right channel and left channel information of the surround channel so that the spatial information for audio from the surround channel matches the spatial information (right versus left) for the front channel. For example, a sound apparently approaching from the listener's right should be heard by the listener on the front right and the back right. The front right sound is provided by a stereo speaker located in front of and to the right of the listener, such as speaker 763B. The back right sound is provided by the Bluetooth speaker 766 which has stereo capability to provide left-right separation. If the system does not invert the right channel and the left channel in the surround channel, the front right sound will be combined with a back left sound and the spatial information of the original multichannel audio stream will be lost or confused. The laptop computer may receive user input from user interface (U/I). User input may include volume adjustment and selection or deselection of right-left inversion, for example. At block 792, the surround channel is provided to the Bluetooth speaker to create for the listener the surround sound effect.

At block 793, the laptop computer may determine if a latency adjustment is necessary. The latency adjustment compensates for differing latencies or delays in playback of audio to the front channel and the surround channel. The surround channel is provided over the Bluetooth speaker, which may introduce a delay. The latency adjust procedure of block 793 may compensate for the introduced delay. The latency adjustment may be accomplished by a manual or an automatic procedure. As indicated in the drawing figure, the latency adjustment may continue processing in a loop including block 793 to continuously update the latency adjustment.

While for purposes of simplicity of explanation, the respective processes are shown and described as a series of blocks in FIG. 7G, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 8:
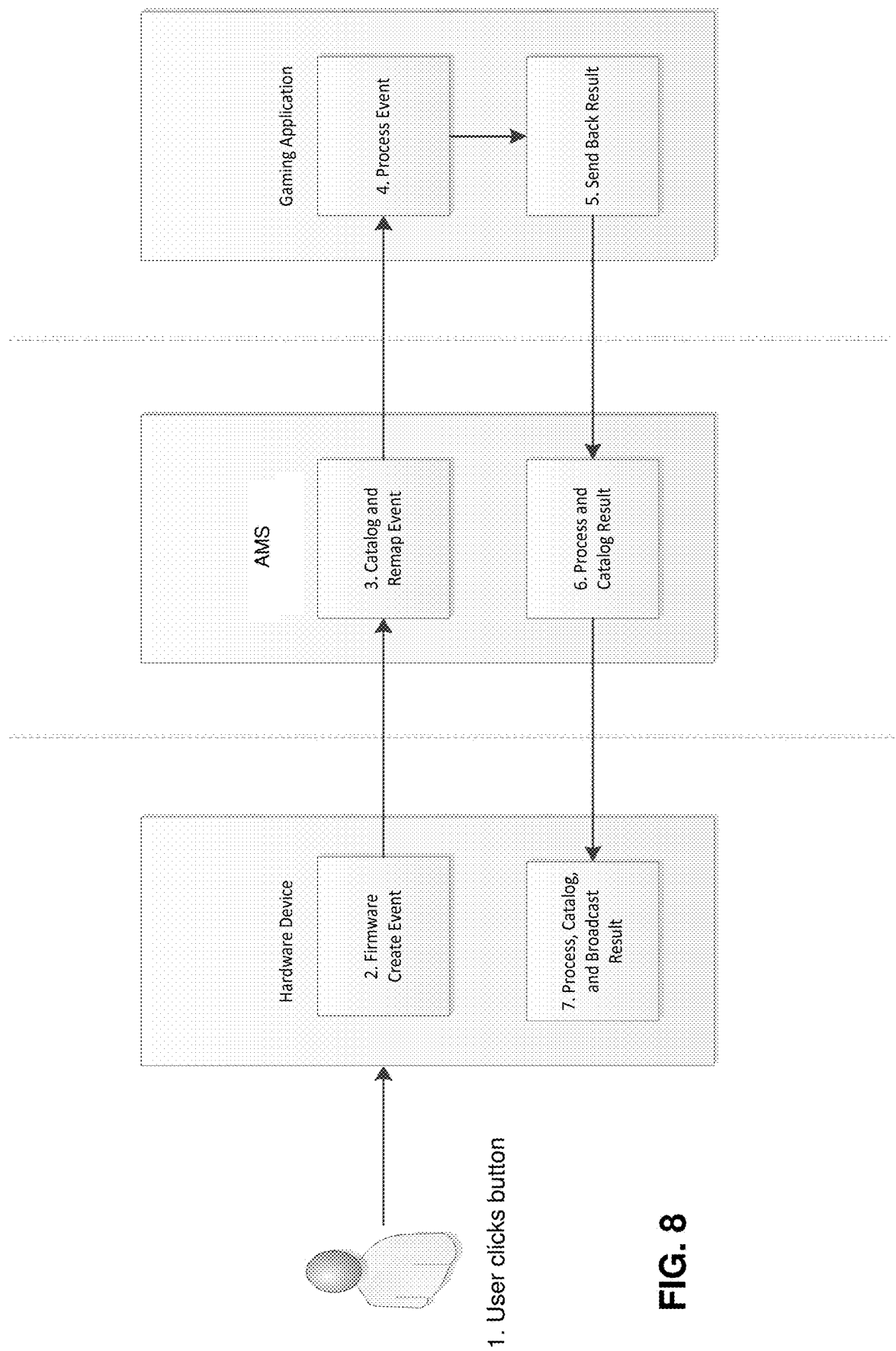
FIG. 8 depicts an illustrative embodiment of a system operating at least in part according to the methods of FIGS. 5-7.
Figure 9:
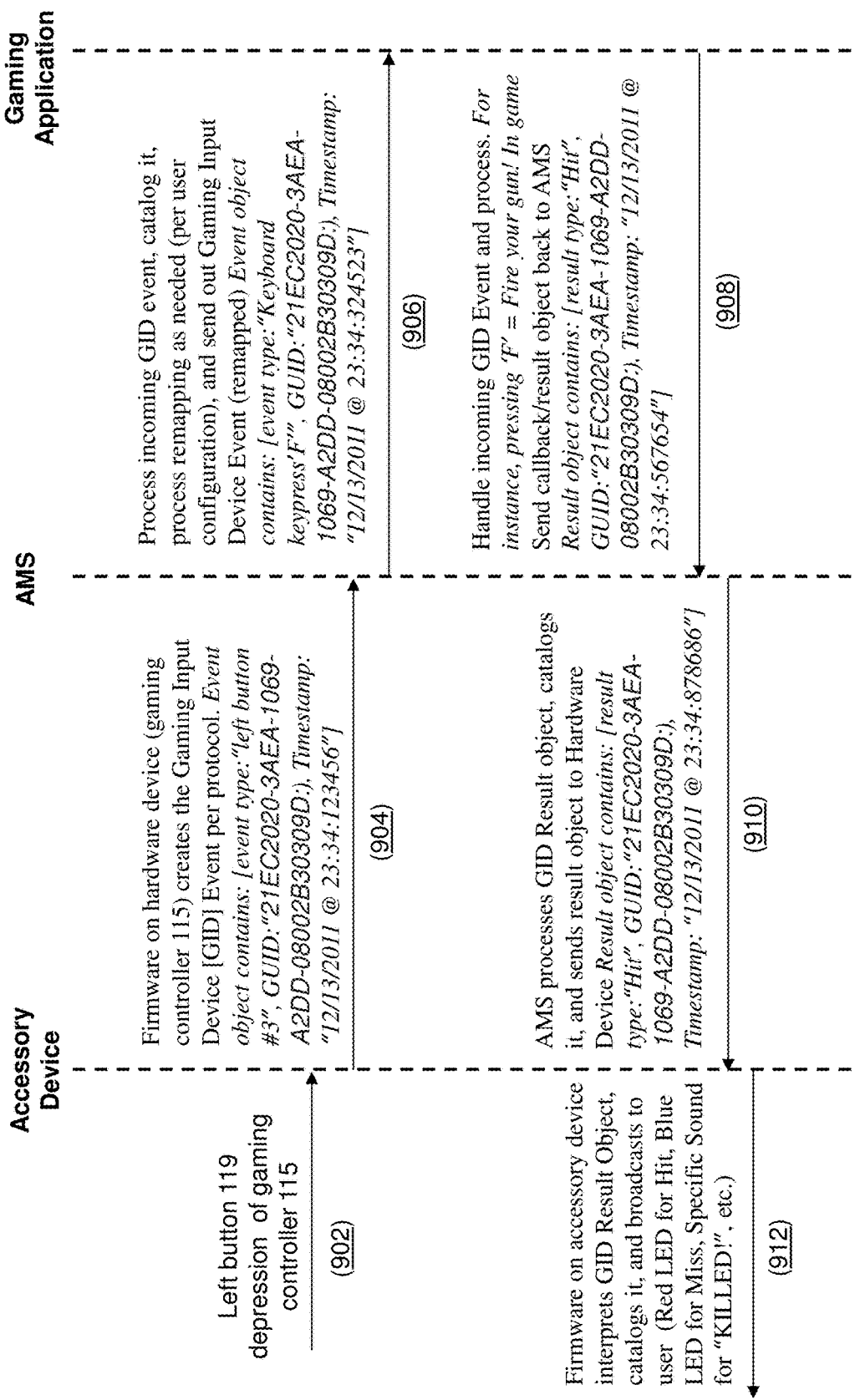
FIG. 9 depicts an illustrative embodiment of a communication flow diagram utilized by the system of FIG. 12.

FIGS. 8-9 illustrate embodiments of a system with a corresponding communication flow diagram for correlating stimulations and gaming action results. In this illustration a user clicks the left button 119 of the gaming controller 115. The gaming controller 115 can include firmware (or circuitry), which creates an event as depicted by event 2 in FIG. 8. The button depression and the event creation are depicted in FIG. 9 as steps 902 and 904. In step 904, the firmware of the gaming controller 115 can, for example, generate an event type "left button #3", and a unique GUID with a time stamp which is submitted to the AMS application. Referring back to FIG. 8, the AMS application catalogues event 3, and if a substitute stimulation has been predefined, remaps the event according to the substitution. The remapped event is then transmitted to the gaming application at event 4. Event 3 of FIG. 8 is depicted as step 906 in FIG. 9. In this illustration, the AMS application substitutes the left button #3 depression stimulus with a "keyboard 'F'" depression which can be interpreted by the gaming application as a fire command. The AMS application in this illustration continues to use the same GUID but substitutes the time stamp for another time stamp to identify when the substitution took place.

Referring back to event 4, the gaming application processes the event and sends back at event 5 a game action result to the AMS application which is processed by the AMS application at event 6. The AMS application then submits the results to the accessory at event 7. Events 4 and 5 are depicted as step 908 in FIG. 9. In this step, the gaming application processes "F" as an action to fire the gamer's gun, and then determines from the action the result from logistical gaming results generated by the gaming application. In the present illustration, the action of firing resulted in a hit. The gaming application submits to the AMS application the result type "Hit" with a new time stamp, while utilizing the same GUID for tracking purposes. At step 910, the AMS application correlates the stimulation "left button #3 (and/or the substitute stimulation keyboard "F") to the game result "Hit" and catalogues them in memory. The AMS application then submits to the accessory (e.g., gaming controller 115) in step 910 the game action results "Hit" with the same GUID, and a new time stamp indicating when the result was received. Upon receiving the message from the AMS application, the accessory in step 912 processes the "Hit" by asserting a red LED on the accessory (e.g., left button 119 illuminates in red or other LED of the gaming controller 115 illuminates in red) to indicate a hit. Other notification notices can be used such as another color for the LED to indicate misses, a specific sound for a hit, or kill, a vibration or other suitable technique for notifying the gamer of the game action result.

Upon reviewing the aforementioned embodiments, it would be evident to an artisan with ordinary skill in the art that the embodiments of the subject disclosure can be modified, reduced, or enhanced without departing from the scope of the claims described below. For example, the AMS application can be executed from an accessory 115 or computing device 206 to perform the embodiments described in the subject disclosure. The AMS application can also be operated from a remote server ("cloud services"). In yet another embodiment, functions of the AMS application can be distributed between devices. In yet another embodiment, the AMS application can be configured to track the performance of a gamer and adapt a threshold as the gamer improves or declines in performance.

For instance, as a gamer's performance improves with a particular gaming action, the threshold associated with the gaming action can be adapted to be less sensitive in detecting an over usage state. Similarly, the sensitivity of the threshold can be increased to promptly identify an over usage state of a gaming action if the gamer's performance declines as a result of an over usage of the gaming action. Additionally, the AMS application can be adapted to add gaming actions to an exclusion table when the gamer's performance substantially improves as a result of using the gaming action being excluded. The exclusion table can also be changed by the AMS application by removing a gaming action from the exclusion table responsive to its excessive use causing a decline in a gamer's performance.

Other embodiments can be applied to the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

FIG. 10 depicts an exemplary diagrammatic representation of a machine in the form of a computer system 1000 within which a set of instructions, when executed, may cause the machine to perform any one or more of the methods described above. The computer system 1000 may facilitate a process including providing a surround sound affect by providing, from a multichannel audio stream, a first audio stream at a primary set of speakers and a surround stream at a supplemental speaker such as a Bluetooth speaker. One or more instances of the machine can operate, for example, as an accessory, computing device or combinations thereof. For example, the machine can be embodied as a laptop computer as an embodiment of apparatus 762 (FIG. 7B). In some embodiments, the machine may be connected (e.g., using a network 1026) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video, or data communication. Further, while a single machine is illustrated, the term "machine" shall also be taken to include any collection of machines that individually or jointly execute a set (or multiple sets) of instructions to perform any one or more of the methods discussed herein.

The computer system 1000 may include a processor (or controller) 1002 (e.g., a central processing unit (CPU)), a graphics processing unit (GPU, or both), a main memory 1004 and a static memory 1006, which communicate with each other via a bus 1008. The computer system 1000 may further include a display unit 1010 (e.g., a liquid crystal display (LCD), a flat panel, or a solid-state display). The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020. In distributed environments, the embodiments described in the subject disclosure can be adapted to utilize multiple display units 1010 controlled by two or more computer systems 1000. In this configuration, presentations described by the subject disclosure may in part be shown in a first of the display units 1010, while the remaining portion is presented in a second of the display units 1010.

The disk drive unit 1016 may include a tangible computer-readable storage medium 1022 on which is stored one or more sets of instructions (e.g., software 1024) embodying any one or more of the methods or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1022 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1000.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or from other steps that have not been described).

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method, comprising:
   receiving, by a processing system comprising a processor and a memory, a multichannel audio stream, the processing system operating under control of an operating system, the operating system configured to prevent provision of an input audio stream from a source to multiple destinations;
   forming, by the processing system, a front channel audio stream of the multichannel audio stream, wherein the forming a front channel audio stream comprises combining a first subset of audio channels of the multichannel audio stream to form the front channel audio stream;
   forming, by the processing system, a surround channel audio stream of the multichannel audio stream, wherein the forming a surround channel audio stream comprises combining a second subset of audio channels of the multichannel audio stream to form the surround channel audio stream;
   exposing, to the processing system, a virtual audio device in the memory, the virtual audio device comprising a first address corresponding to a first audio destination and a second address corresponding to a second audio destination, wherein the virtual audio device includes a source code that embeds a functionality capable of routing audio data of the front channel audio stream of the multichannel audio stream to the first audio destination and audio data of the surround channel audio stream of the multichannel audio stream to the second audio destination, and wherein the virtual audio device comprises no hardware and no firmware;
   writing, by the processing system, the audio data of the front channel audio stream of the multichannel audio stream to the first address of the virtual audio device to enable provision and routing of the front channel audio stream to the first audio destination to be read and processed by other devices;
   providing, by the processing system, the front channel audio stream of the multichannel audio stream to a primary set of speakers positioned in front of a listener;
   writing, by the processing system, the audio data of the surround channel audio stream of the multichannel audio stream to the second address of the virtual audio device to enable provision and routing of the multichannel audio stream to the second audio destination to be read and processed by the other devices;
   wherein the virtual audio device does not process or configure the audio data of the front channel audio stream of the multichannel audio stream and the audio data of the surround channel audio stream of the multichannel audio stream, and wherein the virtual audio device reemits the audio data of the front channel audio stream written to the first address and the audio data of the surround channel audio stream written to the second address to the processing by the other devices;
   providing, by the processing system, the surround channel audio stream to a supplemental speaker positioned behind the listener; and
   synchronizing the front channel audio stream and the surround channel audio stream.

2. The method of claim 1, further comprising:
identifying, by the processing system, a latency mismatch between the front channel audio stream and the surround channel audio stream; and
compensating, by the processing system, for the latency mismatch between the front channel audio stream and the surround channel audio stream to synchronize the front channel audio stream and the surround channel audio stream.

3. The method of claim 2, wherein compensating for the latency mismatch comprises:
measuring, by the processing system, a first delay in sound reproduction of the supplemental speaker;
measuring, by the processing system, a second delay in sound reproduction of the surround channel audio stream to a primary set of speakers; and
introducing, by the processing system, a time delay to reduce a difference between the second delay and the first delay.

4. The method of claim 3, further comprising:
continuously monitoring, by the processing system, a latency mismatch between the front channel audio stream and the surround channel audio stream; and
adjusting, by the processing system, the time delay to reduce the difference between the second delay and the first delay in response to determining that the difference between the second delay and the first delay exceeds a predetermined threshold.

5. The method of claim 2, wherein compensating for the latency mismatch comprises:
providing, by the processing system, a user interface including a graphical device for engagement by a user;
providing, by the processing system, one or more sounds to the front channel audio stream and the surround channel audio stream for perception by the user;
receiving, by the processing system, from the user a user adjustment of the graphical device of the user interface; and
varying, by the processing system, a temporal delay between reproduction of the one or more sounds by the primary set of speakers and the supplemental speaker, wherein the varying is responsive to the user adjustment of the graphical device.

6. The method of claim 1, further comprising:
receiving, by the processing system, a 7.1 surround sound multichannel audio stream, the 7.1 surround sound multichannel audio stream including a front left channel, a center channel, a front right channel, rear left channel, a rear right channel, a surround left channel, a surround right channel and a low-frequency effects channel;
combining, by the processing system, the front left channel, the center channel, and the front right channel to form the front channel audio stream; and
combining, by the processing system, the rear left channel, the rear right channel, the surround left channel, the surround right channel, and the low-frequency effects channel to form the surround channel audio stream.

7. The method of claim 6, further comprising:
reversing, by the processing system, the surround left channel and the surround right channel so that spatial information of the surround channel audio stream matches spatial information of the front channel audio stream.

8. The method of claim 1, further comprising:
communicating, by the processing system, with a digitally connected speaker;
receiving, by the processing system, identification information for the digitally connected speaker;
determining, by the processing system, speaker characteristics of the digitally connected speaker, wherein the determining speaker characteristics is based on the identification information for the digitally connected speaker;
adapting, by the processing system, aspects of the surround channel audio stream according to the speaker characteristics of the digitally connected speaker, forming an adapted surround channel; and
providing, by the processing system, the adapted surround channel to the digitally connected speaker as the supplemental speaker.

9. The method of claim 8, wherein adapting aspects of the surround channel audio stream comprises:
receiving, by the processing system, identification information for a Bluetooth speaker connected as the digitally connected speaker;
determining, by the processing system, speaker characteristics of the Bluetooth speaker;
selecting, by the processing system, spectral components of the surround channel audio stream according to the speaker characteristics of the Bluetooth speaker, forming selected spectral components; and
adjusting, by the processing system, the selected spectral components according to the speaker characteristics of the Bluetooth speaker.

10. The method of claim 8, wherein adapting aspects of the surround channel audio stream comprises:
identifying, by the processing system, limitations in frequency response of the digitally connected speaker, wherein the identifying is based on the speaker characteristics of the digitally connected speaker; and
adjusting, by the processing system, spectral components of the surround channel audio stream to compensate for limitations in frequency response of the digitally connected speaker.

11. A non-transitory machine-readable storage medium, comprising instructions stored in a memory, wherein responsive to executing the instructions, a processor performs operations comprising:
receiving, from an audio sender module of an apparatus, a multichannel audio stream, the apparatus operating under control of an operating system, the operating system configured to prevent provision of an audio stream from an audio source to multiple destinations;
duplicating the multichannel audio stream to produce a first audio stream and a second audio stream;
selecting a first subset of channels of the first audio stream and combining the first subset of channels to produce a front channel audio stream;
selecting a second subset of channels of the second audio stream and combining the second subset of channels to produce a surround channel audio stream;
defining a virtual audio device in the memory, the virtual audio device comprising a first address corresponding to a first audio destination and a second address corresponding to a second audio destination, wherein the virtual audio device includes a source code that embeds a functionality capable of routing audio data of the front channel audio stream of the multichannel audio stream to the first audio destination and audio data of the surround channel audio stream of the multichannel audio stream to the second audio destination, and wherein the virtual audio device comprises no hardware and no firmware;

opening a first new audio stream on the operating system of the apparatus, the first new audio stream configured to provide audio information to a right primary speaker and a left primary speaker of the apparatus, the opening the first new audio stream comprising writing audio data of the first new audio stream to the first address of the virtual audio device to enable provision and routing of the first new audio stream to the first audio destination to be ready and processed by other devices;

routing the front channel audio stream to the first new audio stream;

opening a second new audio stream on the operating system of the apparatus, the second new audio stream configured to provide audio information to a wireless speaker in communication with the apparatus, the opening the second new audio stream comprising writing audio data of the second new audio stream to the second address of the virtual audio device to enable provision and routing of the second new audio stream to the second audio destination to be ready and processed by the other devices, the second audio destination different from the first audio destination;

wherein the virtual audio device does not process or configure the audio data of the front channel audio stream of the multichannel audio stream and the audio data of the surround channel audio stream of the multichannel audio stream, and wherein the virtual audio device reemits the audio data of the front channel audio stream written to the first address and the audio data of the surround channel audio stream written to the second address to the processing by the other devices;

routing the surround channel audio stream to the second new audio stream; and synchronizing the front channel audio stream and the surround channel audio stream.

12. The non-transitory machine-readable storage medium of claim 11, wherein the operations further comprise:

filtering, in a lowpass filter, all channels of the multichannel audio stream to produce a plurality of filtered audio channels;

combining the filtered audio channels to form a created low-frequency effects (LFE) channel;

if the multichannel audio stream includes an existing LFE channel, combining the created LFE channel and the existing LFE channel, forming an LFE channel; and routing the LFE channel to the wireless speaker.

13. The non-transitory machine-readable storage medium of claim 11, wherein the operations further comprise:

combining a front left channel, a center channel and a front right channel of the first audio stream to form the front channel audio stream, the front channel audio stream including a front left stereo channel and a front right stereo channel to provide spatial information for the front channel audio stream;

routing the front left stereo channel and the front right stereo channel to the first new audio stream;

combining a surround left channel, surround right channel, and a low-frequency effects (LFE) channel of the second audio stream to form the surround channel audio stream, the surround channel audio stream including a left channel and a right channel to provide surround spatial information for the surround channel audio stream; and reversing the left channel and the right channel so that the spatial information for the surround channel audio stream matches the spatial information for the front channel audio stream.

14. The non-transitory machine-readable storage medium of claim 11, wherein the operations further comprise:

identifying a latency mismatch between the front channel audio stream and the surround channel audio stream; and compensating for the latency mismatch between the front channel audio stream and the surround channel audio stream to synchronize the front channel audio stream and the surround channel audio stream.

15. The non-transitory machine-readable storage medium of claim 14, wherein compensating for the latency mismatch comprises:

measuring a first delay in sound reproduction of the surround channel audio stream to the wireless speaker;

measuring a second delay in sound reproduction of the front channel audio stream to a primary set of speakers; and delaying, by a predetermined time delay, one of the surround channel audio stream and the front channel audio stream, wherein the predetermined time delay is selected to reduce a difference between the second delay and the first delay.

16. A device, comprising:

a memory to store instructions; and a processor coupled to the memory, wherein responsive to executing instructions, the processor operating under control of an operating system, the operating system configured to prevent provision of an input audio stream from an audio source to more than one destination, the processor performs operations comprising:

processing a media content item to generate a multichannel audio stream;

duplicating the multichannel audio stream to produce a first audio stream and a second audio stream, the first audio stream and the second audio stream including multiple audio channels;

combining respective channels of the first audio stream to form a front channel audio stream, the front channel audio stream having a left audio channel and a right audio channel;

defining a virtual audio device in the memory, the virtual audio device comprising a first address corresponding to a first audio destination and a second address corresponding to a second audio destination, wherein the virtual audio device includes a source code that embeds a functionality capable of routing audio data of the front channel audio stream of the multichannel audio stream to the first audio destination, and wherein the virtual audio device comprises no hardware and no firmware;

writing the audio data of the front channel audio stream to the first address associated with the virtual audio device to enable provision and routing of the front channel audio stream to the first audio destination to be read and processed by other devices;

providing the left audio channel and the right audio channel of the front channel audio stream to a left speaker and a right speaker, respectively, of the device, to provide front channel spatial information at a listening position;

combining respective channels of the second audio stream to form a surround channel audio stream, the surround channel audio stream having a left surround channel and a right surround channel to provide spatial information;

inverting the left surround channel and the right surround channel to provide surround channel spatial information for the listening position that matches the front channel spatial information for the listening position; and wherein the source code further embeds a functionality capable of routing audio data of audio data of the surround channel audio stream of the multichannel audio stream to the second audio destination, writing the audio data of the surround channel audio stream to the second address associated with the virtual audio device to enable provision and routing of the surround channel audio stream to the second audio destination to be read and processed by the other devices, wherein the second audio destination is different from the first audio destination; and wherein the virtual audio device does not process or configure the audio data of the front channel audio stream of the multichannel audio stream and the audio data of the surround channel audio stream of the multichannel audio stream, and wherein the virtual audio device reemits the audio data of the front channel audio stream written to the first address and the audio data of the surround channel audio stream written to the second address to the processing by the other devices;

providing the surround channel audio stream to a wireless speaker in radio communication with the device, the wireless speaker positioned behind the listening position to provide a surround sound effect at the listening position.

17. The device of claim 16, wherein the operations further comprise:

detecting a time delay mismatch between the front channel audio stream and the surround channel audio stream; and compensating for the time delay mismatch between the front channel audio stream and the surround channel audio stream to improve synchronization between the front channel audio stream and the surround channel audio stream.

18. The device of claim 17, wherein the operations further comprise:

measuring a first delay in sound reproduction of the surround channel audio stream to the wireless speaker;

measuring a second delay in the sound reproduction of the front channel audio stream to the left speaker and the right speaker of the device; and introducing a time delay to reduce a difference between the second delay and the first delay.

19. The device of claim 16, wherein the operations further comprise:

receiving, from the wireless speaker, identification information for the wireless speaker;

based on the identification information, determining speaker characteristics of the wireless speaker;

modifying the surround channel audio stream according to the speaker characteristics of the wireless speaker, forming a modified surround channel audio stream; and providing the modified surround channel audio stream to the wireless speaker.

20. The device of claim 19, wherein the modifying the surround channel audio stream according to the speaker characteristics of the wireless speaker comprises compensating a frequency response of the wireless speaker.

* * * * *